United States Patent
Swanson et al.

(10) Patent No.: US 8,647,556 B2
(45) Date of Patent: Feb. 11, 2014

(54) SYSTEM AND METHOD FOR CONTROLLING CURL IN MULTI-LAYER WEBS

(75) Inventors: Ronald P. Swanson, Woodbury, MN (US); Andrew J. Henderson, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 925 days.

(21) Appl. No.: 11/861,769

(22) Filed: Sep. 26, 2007

(65) Prior Publication Data

US 2008/0081164 A1  Apr. 3, 2008

Related U.S. Application Data

(60) Provisional application No. 60/827,374, filed on Sep. 28, 2006, provisional application No. 60/827,368, filed on Sep. 28, 2006.

(51) Int. Cl.
| | |
|---|---|
| B29C 59/16 | (2006.01) |
| B29C 55/00 | (2006.01) |
| B29C 55/12 | (2006.01) |
| B29C 35/08 | (2006.01) |
| B29C 35/10 | (2006.01) |

(52) U.S. Cl.
USPC ........ 264/447; 264/1.34; 264/1.36; 264/1.38; 264/1.6; 264/2.7; 264/134; 264/289.3; 264/289.6; 264/290.2; 264/448; 264/479; 264/494; 264/495

(58) Field of Classification Search
None
See application file for complete search history.

(56) References Cited

U.S. PATENT DOCUMENTS

| | | | |
|---|---|---|---|
| 16,384 | A | 1/1857 | Hamblen |
| 236,068 | A | 12/1880 | Newcomb |
| 273,040 | A | 2/1883 | Dexter |
| 478,255 | A | 7/1892 | Edwards et al. |
| 751,527 | A | 2/1904 | Marr |

(Continued)

FOREIGN PATENT DOCUMENTS

| | | |
|---|---|---|
| DE | 198 08 518 | 8/1999 |
| EP | 0 140 496 | 5/1985 |

(Continued)

OTHER PUBLICATIONS

U.S. Appl. No. 11/861,742, Swanson et al., "System and Method for Controlling Curl in Multi-Layer Webs," filed Sep. 26, 2007.

(Continued)

*Primary Examiner* — Jeffrey Wollschlager
(74) *Attorney, Agent, or Firm* — Scott A. Baum; Adrian L. Pishko

(57) ABSTRACT

A system and method for controlling curl in multi-layer webs. The method can include providing a coated web, curing the coating to form a multi-layer web, and stretching the web during curing of the coating. Some coatings shrink at least partially when cured such that curing the coating induces a strain in the multi-layer web. Stretching the web occurs during curing to induce an opposing strain that at least partially counteracts the strain induced by curing to form a multi-layer web having a desired curvature. The system can include a curing section configured to cure the coating, and can further include a web stretching section, which can be located proximate the curing section and can be substantially coincident with the curing section, such that the web is stretched while the coating is cured.

19 Claims, 12 Drawing Sheets

(56) References Cited

U.S. PATENT DOCUMENTS

| | | | |
|---|---|---|---|
| 754,797 A | 3/1904 | Ostrander | |
| 1,167,036 A | 1/1916 | Witham, Sr. et al. | |
| 1,191,297 A | 7/1916 | Gardner | |
| 1,238,742 A | 9/1917 | Butler | |
| 1,288,643 A | 12/1918 | Mayer | |
| 1,432,832 A | 10/1922 | Brockett | |
| 1,469,875 A | 10/1923 | Beauregard | |
| 1,481,866 A | 1/1924 | Heist | |
| RE16,384 E | 7/1926 | McCrohan et al. | |
| 1,654,946 A | 1/1928 | Sinks | |
| 1,691,023 A | 11/1928 | Dye | |
| 1,792,596 A | 2/1931 | Livingston | |
| 1,880,451 A | 10/1932 | Hopkins | |
| 1,891,782 A | 12/1932 | Sager | |
| 2,027,564 A | 1/1936 | Stein et al. | |
| 2,028,700 A | 1/1936 | Guier | |
| 2,037,825 A | 4/1936 | Salfisberg | |
| 2,066,872 A | 1/1937 | Adams et al. | |
| 2,070,505 A | 2/1937 | Beck | |
| 2,137,887 A | 11/1938 | Abbott | |
| 2,141,318 A | 12/1938 | Salfisberg | |
| 2,152,101 A | 3/1939 | Scherer | |
| 2,184,744 A | 12/1939 | Jonassen | |
| 2,259,362 A | 10/1941 | Young | |
| 2,293,178 A | 8/1942 | Stocker | |
| 2,307,817 A | 1/1943 | Austin | |
| 2,334,022 A | 11/1943 | Minich | |
| 2,335,190 A | 11/1943 | Minich | |
| 2,339,070 A | 1/1944 | Hayes | |
| 2,348,162 A | 5/1944 | Warner | |
| 2,370,811 A | 3/1945 | Osgood, Jr. | |
| 2,373,040 A | 4/1945 | Macdonald et al. | |
| 2,398,822 A | 4/1946 | Faris et al. | |
| 2,403,482 A | 7/1946 | Cloud | |
| 2,411,774 A | 11/1946 | Gundelfinger | |
| 2,412,187 A | 12/1946 | Wiley et al. | |
| 2,434,111 A | 1/1948 | Hawley, Jr. et al. | |
| 2,454,999 A | 11/1948 | Eaton | |
| 2,468,697 A | 4/1949 | Wiley | |
| 2,483,339 A | 9/1949 | Gardner et al. | |
| 2,490,781 A | 12/1949 | Cloud | |
| 2,505,146 A | 4/1950 | Ryan | |
| 2,531,619 A | 11/1950 | Gonia | |
| 2,540,986 A | 2/1951 | Klein et al. | |
| 2,545,868 A | 3/1951 | Bailey | |
| 2,547,836 A | 4/1951 | Pfeiffer | |
| 2,559,365 A | 7/1951 | Middleton et al. | |
| 2,559,705 A | 7/1951 | Borkland | |
| 2,578,899 A | 12/1951 | Pace, Jr. | |
| 2,582,165 A | 1/1952 | Rosenfeld | |
| 2,597,877 A | 5/1952 | LeClair | |
| 2,600,295 A | 6/1952 | Hommel | |
| 2,618,012 A | 11/1952 | Milne | |
| 2,658,432 A | 11/1953 | Baumgartner | |
| 2,660,218 A | 11/1953 | Johnson et al. | |
| 2,698,982 A | 1/1955 | Smith et al. | |
| 2,702,406 A | 2/1955 | Reed | |
| 2,737,089 A | 3/1956 | Baumgartner | |
| 2,745,134 A | 5/1956 | Collins | |
| 2,893,053 A | 7/1959 | Powell | |
| 2,918,891 A | 12/1959 | Klabunde | |
| 2,918,897 A | 12/1959 | Zernov | |
| 2,976,924 A | 3/1961 | Baxter, Jr. | |
| 3,044,228 A | 7/1962 | Peterson | |
| 3,076,492 A | 2/1963 | Monks | |
| 3,215,558 A * | 11/1965 | Dascher | 427/521 |
| 3,344,493 A | 10/1967 | Telgheider | |
| 3,366,298 A | 1/1968 | Bahrani | |
| 3,373,288 A | 3/1968 | Otepka et al. | |
| 3,418,406 A * | 12/1968 | Ball | 264/206 |
| 3,482,343 A | 12/1969 | Hamu | |
| 3,498,878 A | 3/1970 | Obenshain | |
| 3,510,036 A | 5/1970 | Lewis, Jr. et al. | |
| 3,552,668 A | 1/1971 | Kanno | |
| 3,567,093 A | 3/1971 | Johnson | |
| 3,604,652 A | 9/1971 | Sleeper | |
| 3,724,732 A | 4/1973 | Bonner | |
| 3,774,831 A | 11/1973 | Paradine | |
| 3,775,129 A | 11/1973 | Dodwell | |
| 3,799,038 A | 3/1974 | Bossons et al. | |
| 3,831,828 A | 8/1974 | Royon et al. | |
| 3,833,973 A * | 9/1974 | Schwarz | 26/73 |
| 3,854,441 A | 12/1974 | Park | |
| 3,890,547 A | 6/1975 | Keck | |
| 3,913,729 A | 10/1975 | Andrews | |
| 3,939,025 A | 2/1976 | Kane | |
| 3,974,952 A | 8/1976 | Swanke et al. | |
| 3,976,528 A | 8/1976 | James | |
| 4,002,047 A | 1/1977 | MacPhee et al. | |
| 4,013,284 A | 3/1977 | Demetre | |
| 4,015,050 A | 3/1977 | Birchall et al. | |
| 4,033,492 A | 7/1977 | Imai | |
| 4,043,995 A | 8/1977 | Kitzing | |
| 4,060,236 A | 11/1977 | Carstedt | |
| 4,069,081 A | 1/1978 | Drower et al. | |
| 4,069,959 A | 1/1978 | Bartell et al. | |
| 4,119,309 A | 10/1978 | Mayer et al. | |
| 4,141,735 A | 2/1979 | Schrader et al. | |
| 4,182,472 A | 1/1980 | Peekna | |
| 4,187,113 A | 2/1980 | Mathews et al. | |
| 4,190,245 A | 2/1980 | Brandes | |
| 4,300,891 A | 11/1981 | Bemiss | |
| 4,300,969 A | 11/1981 | Frydendal | |
| 4,322,802 A | 3/1982 | Lewis et al. | |
| 4,342,412 A | 8/1982 | Lorenz et al. | |
| 4,343,991 A | 8/1982 | Fujiwara et al. | |
| 4,348,456 A * | 9/1982 | Imanaka et al. | 428/336 |
| 4,360,356 A | 11/1982 | Hall | |
| 4,389,455 A | 6/1983 | Asao | |
| 4,467,949 A | 8/1984 | Nakata | |
| 4,471,816 A | 9/1984 | Wada | |
| 4,539,072 A | 9/1985 | Frye et al. | |
| 4,579,815 A | 4/1986 | Kiritani | |
| 4,598,849 A | 7/1986 | Frye et al. | |
| 4,657,614 A | 4/1987 | Andersson | |
| 4,685,230 A | 8/1987 | Mason, III | |
| 4,862,565 A | 9/1989 | Damour | |
| 4,917,844 A | 4/1990 | Komai et al. | |
| 4,925,520 A | 5/1990 | Beaudoini et al. | |
| 4,952,281 A | 8/1990 | Akira | |
| 5,043,036 A | 8/1991 | Swenson | |
| 5,124,743 A | 6/1992 | Shiota | |
| 5,141,484 A | 8/1992 | Akira | |
| 5,244,861 A | 9/1993 | Campbell et al. | |
| 5,290,672 A | 3/1994 | Dunk | |
| 5,387,501 A | 2/1995 | Yajima et al. | |
| 5,466,519 A | 11/1995 | Shirakura et al. | |
| 5,517,737 A | 5/1996 | Viltro et al. | |
| 5,536,561 A * | 7/1996 | Turi et al. | 428/212 |
| 5,560,793 A | 10/1996 | Ruscher et al. | |
| 5,677,050 A | 10/1997 | Bilkadi et al. | |
| 5,738,907 A * | 4/1998 | Vaccaro et al. | 427/172 |
| 5,853,965 A | 12/1998 | Haydock et al. | |
| 5,866,282 A | 2/1999 | Bourdelais et al. | |
| 5,874,205 A | 2/1999 | Bourdelais et al. | |
| 5,888,643 A | 3/1999 | Aylward et al. | |
| 5,900,218 A | 5/1999 | LaRose et al. | |
| 5,928,124 A | 7/1999 | Gherardi et al. | |
| 5,975,745 A | 11/1999 | Oishi et al. | |
| 6,030,742 A | 2/2000 | Bourdelais et al. | |
| 6,152,345 A | 11/2000 | Griffin et al. | |
| 6,238,448 B1 | 5/2001 | Rouse | |
| 6,272,984 B1 | 8/2001 | Kato et al. | |
| 6,273,984 B1 | 8/2001 | Bourdelais et al. | |
| 6,362,020 B1 | 3/2002 | Shimoda et al. | |
| 6,489,015 B1 | 12/2002 | Tsuchiya et al. | |
| 6,626,343 B2 | 9/2003 | Crowley et al. | |
| 6,637,128 B2 * | 10/2003 | Kuroiwa et al. | 34/629 |
| 6,670,545 B2 * | 12/2003 | Botrie | 174/388 |
| 6,680,084 B1 | 1/2004 | Chtourou | |
| 6,686,031 B2 | 2/2004 | Matsufuji et al. | |
| 6,780,371 B2 * | 8/2004 | Shibano et al. | 264/446 |
| 6,820,671 B2 | 11/2004 | Calvert | |
| 6,841,254 B2 * | 1/2005 | Okajima et al. | 428/423.7 |

(56) References Cited

U.S. PATENT DOCUMENTS

| | | | |
|---|---|---|---|
| 7,867,531 B2 * | 1/2011 | Pockat et al. | 428/35.7 |
| 2001/0051275 A1 | 12/2001 | Muraoka | |
| 2003/0082977 A1 | 5/2003 | Kuroiwa et al. | |
| 2004/0235380 A1 | 11/2004 | Kapik | |
| 2004/0247916 A1 | 12/2004 | MacDonald et al. | |
| 2005/0133965 A1 | 6/2005 | Yu et al. | |
| 2005/0212173 A1 | 9/2005 | Swanson | |
| 2005/0246965 A1 | 11/2005 | Swanson | |
| 2006/0182901 A1 | 8/2006 | Takagi | |
| 2007/0021553 A1 * | 1/2007 | Lichte et al. | 524/591 |
| 2008/0081123 A1 | 4/2008 | Swanson et al. | |

FOREIGN PATENT DOCUMENTS

| | | |
|---|---|---|
| EP | 0 472 393 | 2/1992 |
| EP | 0 658 505 A1 | 6/1995 |
| EP | 0 672 516 | 9/1995 |
| EP | 0 688 665 | 12/1995 |
| EP | 1 066 979 A2 | 1/2001 |
| EP | 1 258 555 A1 | 11/2002 |
| EP | 1 317 966 | 6/2003 |
| GB | 456832 | 8/1935 |
| JP | 60-158028 | 8/1985 |
| JP | 63-171755 | 7/1988 |
| JP | 2000-275969 | 10/2000 |
| JP | 2000-351499 | 12/2000 |
| WO | WO 97/32069 | 9/1997 |
| WO | WO 98/56702 | 12/1998 |
| WO | WO2004035651 * | 4/2004 |
| WO | WO 2007/110484 | 10/2007 |
| WO | WO 2008/039822 A1 | 4/2008 |

OTHER PUBLICATIONS

E. M. Corcoran, "Determining Stresses in Organic Coatings Using Plate Beam Deflection," Journal of Paint Technology, vol. 41, No. 538, pp. 635-640, Nov. 1969.

L. F. Francis, A. V. McCormick, and D. M. Vaessen, "Development and Measurement of Stress in Polymer Coatings," Journal of Materials Science, 37: 4717-4731, 2002.

R. P. Swanson, "Measurement of Web Curl," Proceedings of the Applied Webhandling Conference, AIMCAL, May 7-10, 2006, 9 pages.

S.G. Croll, "Internal Stress in a Solvent-Cast Thermoplastic Coating," Journal of Coatings Technology, vol. 50, No. 638, pp. 33-38, Mar. 1978.

* cited by examiner

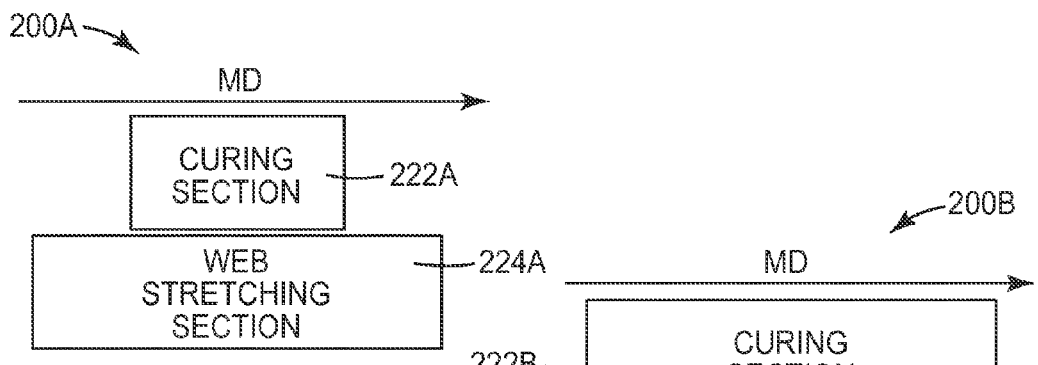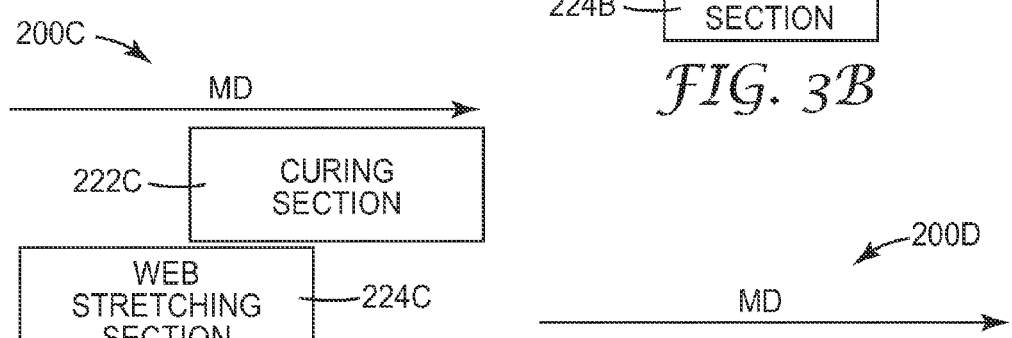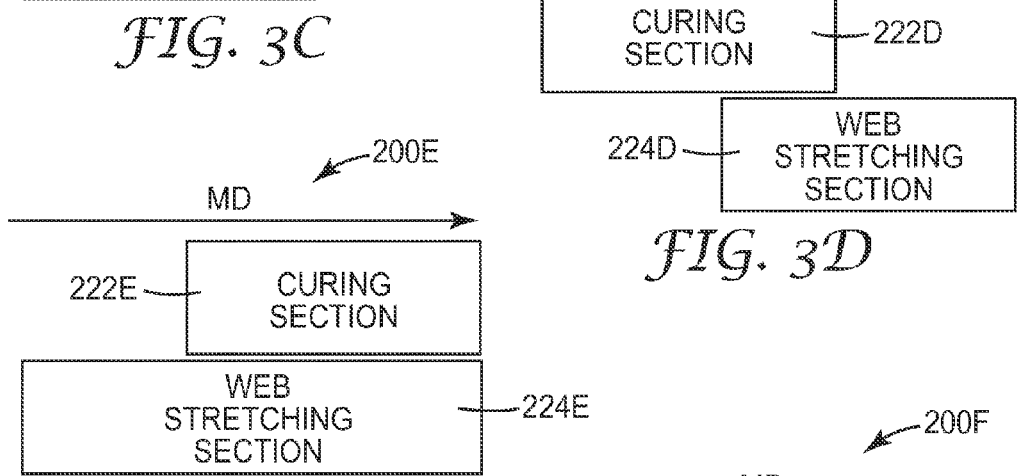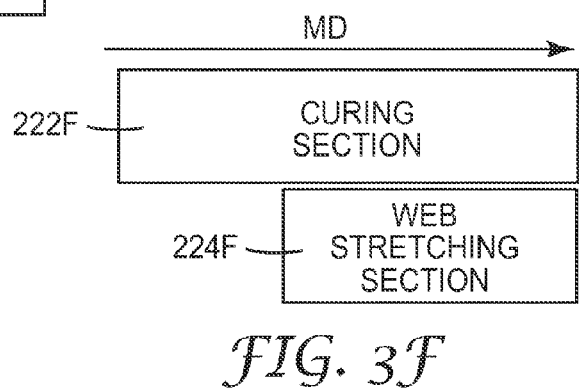

SYSTEM AND METHOD FOR CONTROLLING CURL IN MULTI-LAYER WEBS

RELATED APPLICATIONS

Priority is hereby claimed to U.S. Provisional Patent Application No. 60/827,374 (3M File No. 60922US002), filed Sep. 28, 2006 and U.S. Provisional Patent Application No. 60/827,368 (3M File No. 62542US002), filed Sep. 28, 2006, both of which are incorporated herein by reference in their entirety.

FIELD

The present disclosure generally relates to multi-layer webs and controlling curl in multi-layer webs, particularly, multi-layer webs in which at least one layer comprises a cured coating.

BACKGROUND

Some multi-layer webs have a tendency to curl. Curl can be defined as the tendency of a web (or multi-layer web) to deviate from a generally flat or planar orientation when there are no external forces on the web. Curled webs can be viewed as a defective product and can be more difficult to handle in downstream web handling or manufacturing processes than flat webs. For example, processes such as laminating, inspecting, and converting can be more challenging with a curled web than with a flat web. In addition, some multi-layer webs that are formed of a coating applied to an underlying web are used in applications in which the non-coated side of the multi-layer web is coupled to another object such that the coated side of the multi-layer web faces outwardly. Such multi-layer webs tend to curl toward the coated side, which can cause problems with delamination. In such applications, flat multi-layer webs, or webs that tend to curl to the non-coated side may be easier to apply, and may result in better adhesion, less delamination, and longer product lives. In other applications, a particular amount and orientation of curvature is necessary.

As a result, web handling processes and systems that produce a multi-layer web having a desired curvature may reduce the problems described above and improve product quality and reduce manufacturing waste.

SUMMARY

One aspect of the present disclosure is directed to a method for reducing strain-induced curl in a multi-layer web. The method can include providing a coated web that includes a coating applied to a web of indeterminate length, the coating being characterized by at least partially shrinking when cured. The method can further include curing the coating to form a multi-layer web, the multi-layer web including a strain induced by curing the coating. The method can further include stretching the web during curing of the coating, wherein stretching the web substantially cancels the strain induced by curing such that the resulting multi-layer web is substantially flat.

Another aspect of the present disclosure is directed to a method for producing a multi-layer web having a desired curvature. The method can include providing a coated web that includes a coating applied to a web of indeterminate length. The method can further include curing the coating to form a multi-layer web, the multi-layer web including a strain induced by curing the coating. The method can further include stretching the web during curing of the coating to induce an opposing strain in the web that at least partially counteracts the strain induced by curing, such that the resulting multi-layer web has a desired curvature.

Another aspect of the present disclosure is directed to a light-redirecting film having a thickness of less than about 300 μm and a curvature of less than about 0.1 m$^{-1}$.

Another aspect of the present disclosure is directed to a web handling system for producing a multi-layer web having a desired curvature. The web handling system can include a curing section configured to cure a coating applied to a web of indeterminate length to form a multi-layer web. The web handling system can further include a web stretching section configured to stretch the web to induce a strain in the web. The web stretching section can be located proximate the curing section and can be substantially coincident with the curing section, such that the web is stretched while the coating is cured.

Other features and aspects of the disclosure will become apparent by consideration of the detailed description and accompanying drawings.

BRIEF DESCRIPTION OF THE DRAWINGS

FIGS. 3A-3F are block diagrams of web handling systems according to other embodiments of the present disclosure.

DETAILED DESCRIPTION

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "coupled" and "applied to," and variations thereof are used broadly and encompass both direct and indirect couplings and applications. It is to be understood that other embodiments may be utilized, and structural or logical changes may be made without departing from the scope of the present disclosure. Furthermore, terms such as "front," "rear," "top," "bottom," "side," and the like are only used to describe elements as they relate to one another, but are in no way meant to recite specific orientations of the apparatus, to indicate or imply necessary or required orientations of the apparatus, or to specify how the embodiments described herein will be used, mounted, displayed, or positioned in use.

Figure 1:
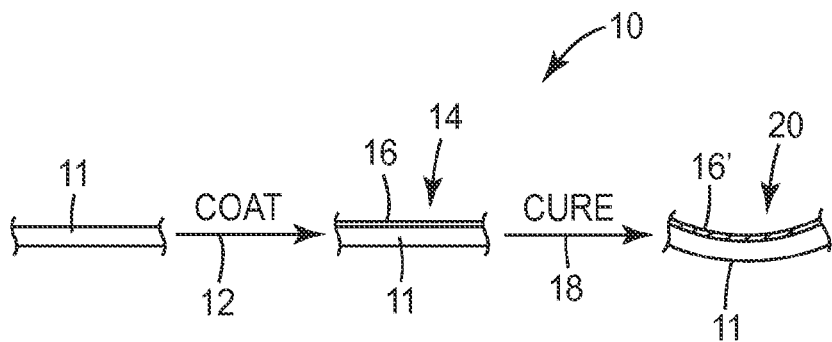
FIG. 1 is a schematic flow chart of a prior art web handling process.

The present disclosure generally relates to multi-layer webs and controlling curl in multi-layer webs. In some multi-layer webs, at least one of the layers comprises a cured coating. For example, some multi-layer webs are formed by applying a coating to an underlying web and then curing and/or drying the coating. Many coatings have a tendency to shrink upon drying and curing, while the underlying web remains substantially the same size, which can cause the resulting multi-layer web to curl toward the coated side. This phenomenon is illustrated in FIG. 1, which schematically illustrates a prior art web coating process 10. In some embodiments, the coating, after being cured, has a Young's modulus that is less than or equal to that of the web. In such embodiments, the maximum curvature generally occurs when the coating-to-web thickness ratio (i.e., the ratio of the coating thickness to the web thickness) is between about 0.5 and about 1.0. Generally, within this range, the curvature of the resulting multi-layer web increases with increasing coating-to-web thickness ratio.

As shown in FIG. 1, a web 11 of indeterminate length is coated in a coating process 12 to form a coated web 14 having a coating 16 applied to the web 11. The coating 16 is then cured in a curing process 18 to form a multi-layer web 20 formed of the coating 16' in a cured state coupled to the web 11. As shown in FIG. 1, the multi-layer web 20 includes an undesirable curvature. The curvature of the multi-layer web 20 is a result of the shrinkage of the coating 16 upon being cured, while the underlying web 11 remains substantially the same size. When the multi-layer web 20 is used in applications in which the multi-layer web 20 is required to be flat, the cured coating 16' of the multi-layer web 20 will be in tension. Over time, the stress on the coating 16' that occurs during use of the multi-layer web 20 may cause the coating 16' to crack or craze, leading to undesirable product life.

Some approaches that have been used to try to control curl in multi-layer webs include (1) reformulating the coating chemistry to reduce shrinkage, (2) under-curing the coating to reduce shrinkage (3) increasing machine direction line tensions, (4) post-cure processes such as shrinking the web, and (5) increasing the thickness of the underlying web to increase the web's resistance to curling. Option 1 generally results in an undesirable compromise between coating functionality and shrinkage, e.g., a hardcoating that is not very hard. Option 2 generally results in a coating of lower strength that is less durable, less hard, and/or less tough. In addition, because at least a portion of the coating is under-cured, it can include unreacted monomers, which can cause undesirable downstream reactions that may affect product quality. Option 3 is not always successful because increasing machine directional tension creates an increased cross-machine directional compression due to the Poisson effect, which can exacerbate cross-machine directional curl. Option 4 can be limited by the type of web used and the amount of shrinkage that is available with a given web. Option 5 can limit the types of webs that can be used and can be a limiting factor in new product design. In addition, thicker webs increase cost and are not always the most desirable for a given application or product.

On the contrary, methods of the present disclosure can be used to control the curl of the resulting multi-layer web such that the resulting multi-layer web has a desired curvature, or is substantially flat. In some embodiments of the present disclosure, the multi-layer web has a curvature of less than about 10.0 $m^{-1}$, particularly, less than about 5.0 $m^{-1}$, and more particularly, less than about 2.0 $m^{-1}$. Furthermore, in some embodiments, the multi-layer web has a curvature less than about 1.0 $m^{-1}$, particularly, less than about 0.5 $m^{-1}$, and more particularly, less than about 0.1 $m^{-1}$. In other words, in some embodiments, the multi-layer web has a radius of curvature greater than about 0.1 m, particularly, greater than about 0.2 m, and more particularly, greater than about 0.5 m. Furthermore, in some embodiments, the multi-layer web has a radius of curvature of greater than about 1 m, particularly, greater than about 2 m, and more particularly, greater than about 10 m.

By producing a multi-layer web that is substantially flat, the strains between adjacent layers are better matched such that minimal stresses are exerted on the layers when used in an application requiring a substantially flat web. As a result, multi-layer webs of the present disclosure are generally less susceptible to cracking and have longer products lives. In addition, by controlling the curl of the multi-layer web without necessarily increasing the thickness of the underlying web, a multi-layer web of a desired thickness can be formed. For example, in some embodiments of the present disclosure, the multi-layer web has a thickness of less than about 500 μm, particularly, less than about 300 μm, and more particularly, less than about 200 μm. In some embodiments, the multi-layer web has a thickness of less than about 125 μm, particularly, less than about 25 μm, and more particularly, less than about 14 μm.

Co-owned U.S. Patent Application Publication Nos. 2005/0212173 and 2005/0246965, which are incorporated herein by reference, describe removing curl in coated webs by flexing or reverse flexing the coated web after the coating has been cured. However, some webs are brittle and some coatings become brittle after being cured. Exposing such a coating to bending or stretching processes after curing can cause the coating to crack and craze, rather than yield, which can lead to poor product quality and lifespan. As a result, stretching the multi-layer web after the coating has been cured is not necessarily preferred for some coatings and multi-layer webs.

The present disclosure can be applied to a variety of webs and coatings. Examples of webs that can be used include, but are not limited to, webs formed of polymers, composite materials, wood pulp (e.g., paper), and combinations thereof. Polymeric webs can be formed of homopolymers or copolymers and can include, but are not limited to, polyethylene terephthalate (PET), polycarbonate (PC), polyolefins (e.g., polypropylene (PP), polyethylene (PE), etc.), and combinations thereof. Coatings can be formed of a variety of materials, including polymers, composite materials, and combinations thereof. Examples of polymer coatings include, but are not limited to, acrylate or epoxy coatings (e.g., acrylate or epoxy hardcoats). Examples of composite coatings include, but are not limited to, coatings that include particles or fibers (e.g., colloidal or fibrous metal or metal oxide particles.

Furthermore, a variety of curing processes suitable for curing a coating can be used, depending on the type of coating used. Examples of curing processes can include, but are not limited to, at least one of actinic radiation, UV radiation, visible-light radiation, electron beam radiation, X-ray radiation, IR radiation, heat, and combinations thereof.

The multi-layer webs of the present disclosure can be used in a variety of applications. For example, the multi-layer webs can include light-redirecting films (e.g., brightness enhancement films (e.g., prismatic-structured films), turning films, and diffusing films), multi-layer optical films, polarization films, barrier films, protective films, and combinations thereof, all of which can be used in electronic displays (e.g., liquid crystal displays (LCDs), monitors, touch screens, personal digital assistants (PDAs), cellular telephones, etc.). Particularly, in some embodiments, the multi-layer web includes a light-redirecting film having a thickness of less than about 300 μm and a curvature of less than about 0.1 m$^{-1}$. Additional examples of applications in which multi-layer webs of the present disclosure can be used include traffic control film applications, graphic film applications, other protective or barrier film application (e.g., applications in the architectural and/or transportation industries), and combinations thereof.

Figure 2:
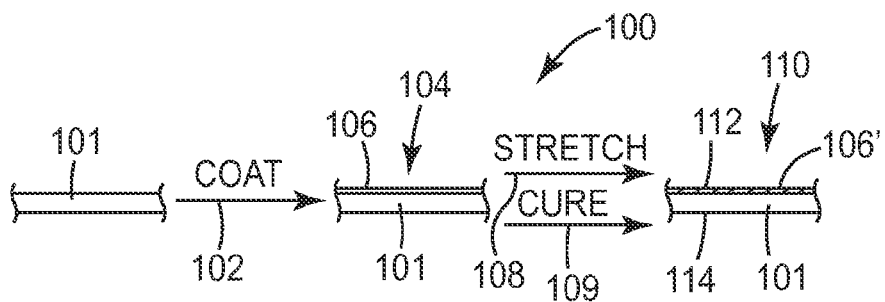
FIG. 2 is a schematic flow chart of a web handling process according to one embodiment of the present disclosure.

FIG. 2 illustrates a web handling processes 100 of the present disclosure. As shown in FIG. 2, a web 101 of indeterminate length is coated in a coating process 102 to form a coated web 104 having a coating 106 applied to the web 101. The web 101 is then stretched in a web stretching process 108 to induce a strain in the web 101, and the coating 106 is cured in a curing process 109 to form a multi-layer web 110. The multi-layer web 110 includes the coating in a cured state 106' coupled to the web 101. As shown in FIG. 2, the web stretching process 108 and the curing process 109 occur substantially simultaneously. Because the coating 106 has not been dried or cured when the web 101 begins to be stretched, the coating 106 has relatively fluid characteristics and is not significantly mechanically affected by the web stretching process 108. The strain induced in the web 101 by the web stretching process 108 is predetermined to at least partially counteract any strain induced by the curing process 109, such that the resulting multi-layer web 110 has the desired curvature.

In some embodiments of the present disclosure, the strain induced by the web stretching process 108 falls within the elastic range of the web 101 (i.e., below the yield strain, or elastic limit, of the web 101). That is, in such embodiments, the web 101 is not stretched beyond its elastic limit and is not plastically deformed. As a result, when the web 101 is released by the web stretching process 108, the web 101 relaxes back to its original, unstretched state. The percent strain that is needed to induce an elastic strain in the web 101 without plastically deforming the web depends on the web material. For example, in some embodiments, the strain induced by the web stretching process 108 is within the elastic range of the web 101 and is less than about 10% strain, particularly, less than about 5% strain, and more particularly, less than about 2% strain.

By stretching the web while the coating is being cured, any strain that will result from curing the coating can be reduced, negated or reversed by stretching the web to achieve a necessary amount of strain in the necessary direction. For example, if a particular coating shrinks substantially uniformly by about 1%, one can approximate that the cured coating can cause the underlying web (i.e., the surface of the underlying web adjacent the coating) to be strained by about 1% strain. As a result, the cured coating will essentially "pull" on the underlying web by about a 1% strain. If a substantially flat multi-layer web is desired, the underlying web can be stretched in the machine direction and the cross-machine direction to about a 1% strain while the coating is being cured, causing the coating and the web to be coupled together with matching strain. When the web strain is released (i.e., when the web is released from being stretched), the resulting multi-layer web is substantially flat and substantially stress-free. If 1% strain is within the elastic range of the web material, after the web is released from being stretched, it will return to its original, unstretched state without substantially affecting the makeup or internal structure of the web. Plastic deformation, on the other hand, can cause remodeling of the internal grains or fibers of the web material, which occurs to attempt to balance the external forces, or relieve the external stresses, being applied to the web. In simple elastic deformation, however, the internal structure of the web is not being substantially altered, and the external forces applied to the web by stretching the web can be used to oppose the forces exerted on the web by the coating being cured.

A method of measuring stress development during curing of polymer coatings is discussed in the article "Development and measurement of stress in polymer coatings", (L. F. Francis, A. V. McCormick, D. M. Vaessen, Journal Of Materials Science 37 (2002), 4717-4731), which is incorporated herein by reference. Generally, there is a lag between the start of the curing process and the start of coating stress development. Coating stress starts to develop when the coating has cured enough to elastically support stress. This condition is sometimes referred to as "the initial solidification." From this point, the stress generally increases more rapidly, until it reaches a plateau when the coating is substantially cured.

In some embodiments, the curing process 109 begins at or shortly after the point at which the web 101 is maximally stretched by the web stretching process 108. That is, in such embodiments, the curing process 109 can begin when the web 101 is maximally stretched or when the web 101 has begun its rebound back to its original, unstretched state. The web stretching process 108 can include more than one stretching step (e.g., one or more stretching steps can occur before or after the curing process 109), as long as the web 101 is stretched during the curing process 109, including during all or a portion of the time of coating stress development, which begins at the point of initial solidification of the coating and ends when the coating has been substantially cured.

In the embodiment illustrated in FIG. 2, the resulting multi-layer web 110 is substantially flat and substantially without internal stresses. The multi-layer web 110 is illustrated in FIG. 2 as being substantially flat by way of example only. Particularly, the web 101 illustrated in FIG. 2 is stretched to induce a strain that matches and opposes (and thus substantially cancels) the strain induced in the multi-layer web 110 by curing the coating 106. The resulting multi-layer web 110 lies substantially flat when there are no external forces on it. A "substantially flat" multi-layer web generally refers to a multi-layer web that has a radius of curvature of at least about 10 m, and a curvature of less than about 0.1 m$^{-1}$. With reference to FIG. 2, a "substantially flat" multi-layer web can also be described as a multi-layer web that has a substantially planar upper surface 112 and a substantially planar lower surface 114 that is substantially parallel with the upper surface 112.

However, it should be understood that the strain induced in the web 101 by the web stretching process 108 can be controlled to at least partially counteract the strain induced by curing the coating 106. That is, it should be understood that the strain induced in the web 101 by the web stretching process 108 can reduce, match or reverse the strain that will be induced by the curing process 109. For example, in some applications, a very slight curl in the multi-layer web 110 may be desirable, such that the curl induced by curing the coating 106 needs to be reduced but not cancelled. In some applications, a multi-layer web 110 that curls in the direction opposite the coating 106 may be desirable.

To match, reduce or reverse the curl induced by the curing process 109, the properties of the coating 106 need to be well-understood so that the web stretching process 108 can be controlled to strain the web 101 in the appropriate manner to achieve the desired multi-layer web 110. The amount of strain that needs to be induced in the web 101 during the web stretching process 108 increases as the desired multi-layer web 110 goes from having a slight curl in the direction of the coating 106, to being substantially flat, to being curled in the direction opposite the coating 106.

By way of further example, the multi-layer web 110 is illustrated as including two layers, namely, the cured coating 106' and the web 101. However, it should be understood that the multi-layer web 110 can include more than two layers, and subsequent or parallel processing can be employed to achieve such multi-layer webs. For example, the coating process 102 can include additional coating steps such that additional coatings are applied to the web 101 (e.g., on top of the coating 106 shown in FIG. 2), and then all coatings can be cured substantially simultaneously in the curing process 109, or the curing process 109 can include multiple subsequent curing steps to cure each coating in succession. Alternatively, in some embodiments, the web handling process 100 can be repeated for each additional layer to achieve a multi-layer web 110 having more than two layers. Such embodiments can be understood by one of ordinary skill in the art based on the teachings of the present disclosure and are within the spirit and scope of the present disclosure.

In some embodiments of the present disclosure, the web handling process 100 does not include the coating process 102, but rather the web is provided in the form of the coated web 104. For example, a supplier can supply the coated web 104, and the remainder of the web handling process 100 can be used to achieve a multi-layer web 110 of desired curvature.

Figure 3:
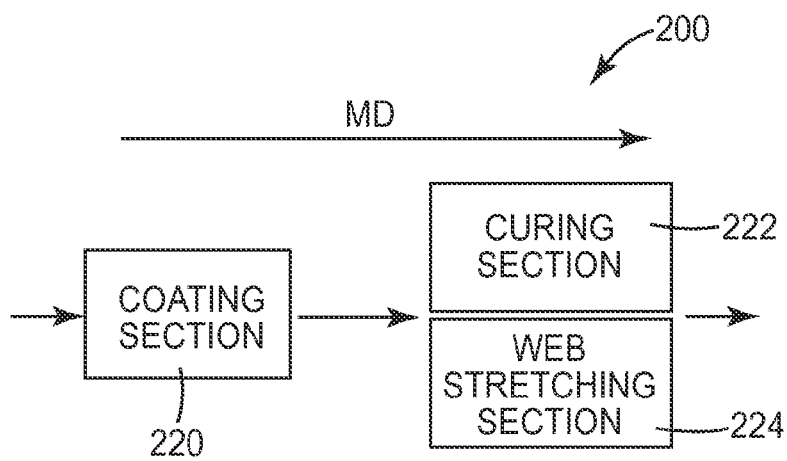
FIG. 3 is a block diagram of a web handling system according to one embodiment of the present disclosure.

FIG. 3 illustrates a web handling system 200 for forming multi-layer webs having desired curvatures. The web handling system 200 illustrated in FIG. 3 is generally used to perform the web handling process 100 illustrated in FIG. 2. The machine direction of the web handling system 200 is illustrated by the arrow labeled "MD".

As shown in FIG. 3, the web handling system 200 includes a coating section 220, a curing section 222, and a web stretching section 224. Relative to the motion of a web moving in the MD through the web handling system 200, the coating section 220 is upstream of the curing section 222 and the web stretching section 224. In addition, the curing section 222 and the web stretching section 224 are substantially coincident relative to a web moving in the MD, such that the web is stretched to induce a strain in the web while the coating is cured to form a multi-layer web of a desired curvature. In other words, stretching of the web occurs during curing of the coating.

In some embodiments of the present disclosure, the web handling system 200 does not include the coating section 220, but rather the web is provided in the form of a coated web that can then be directed through the curing section 222 and the web stretching section 224 of the web handling system 200.

In FIG. 3, the coating section 220, the curing section 222 and the web stretching section 224 are illustrated as being discrete and separate sections. However, it should be understood that this is a schematic illustration to depict the overall layout of the web handling system 200. The coating section 220, the curing section 222 and the web stretching section 224 do not necessarily need to be separate and discrete from one another, but rather it should be understood that they can overlap, as long as the web is in a stretched configuration during all or a portion of the time of coating stress development, which begins at the point of initial solidification of the coating and ends when the coating has been substantially cured.

Furthermore, the schematic illustration of the web handling system 200 shown in FIG. 3 depicts the curing section 222 as exactly overlapping the web stretching section 224. However, the direct overlap of the curing section 222 and the web stretching section 224 is shown by way of example only. As described above, the web is stretched during all or a portion of coating stress development. Accordingly, when the web stretching process is described as occurring "during curing" or "substantially simultaneously" with the curing process, this generally refers to the web stretching occurring during all or a portion of the coating stress development portion of the curing process. Similarly, when the web stretching section 224 is described as being "substantially coincident" with the curing section 222, this generally refers to the web stretching section 224 overlapping the portion of the curing section 222 in which at least a portion of the coating stress development is occurring. However, the web stretching section 224 and the curing section 222 do not need to exactly overlap to be "substantially coincident."

FIGS. 3A-3F illustrate alternative embodiments of the web handling system 200 of the present disclosure, namely, web handling systems 200A-F. The web handling systems 200A-F illustrate additional embodiments of the web handling system of the present disclosure. The web handling systems 200A-F do not include a coating section but illustrate other exemplary configurations of the curing section 222 and the web stretching section 224 that are possible and within the spirit and scope of the present disclosure.

In some embodiments of the present disclosure, one or more of the curing section 222 and the web stretching section 224 extends further in the MD than the other. That is, the curing section 222 and the web stretching section 224 can be configured such that the curing and web stretching occurs substantially simultaneously, but that web stretching can begin prior to the coating being cured and end after the coating is cured (e.g., the web can be stretched in a first direction and then additionally stretched in a second direction during curing), or the coating can begin being cured prior to the web being stretched (e.g., the coating can be pre-cured) and end after the web is stretched (e.g., the coating can be "over cured"). For example, in the web handling system 200A illustrated in FIG. 3A, the web stretching section 224A extends upstream and downstream of the curing section 222A, but a portion of the web stretching section 224A is coincident with the curing section 222A. As a result, the web is in a stretched configuration before, during and after the coating is cured. In such embodiments, for example, a stretching process can be employed in which the web reaches a maximal amount of stretch when the web is passed through the curing section 222A. In some embodiments of the web handling system 200A, the web can be stretched throughout the web handling system 200A in the machine direction using an appropriate web line tension, and the web can be additionally stretched in a cross-machine direction while the coating is being cured in the curing section 222A. Such web stretching sections 224A can be thought to include a first portion in which the web is stretched in a machine direction and a second portion in which the web is stretched in a cross-machine direction, during which the coating is cured in the curing section 222A. Alternatively, in the web handling system 200B illustrated in FIG. 3B, the curing section 222B extends upstream and downstream of the web stretching section 224B. As a result, the coating is being cured in the curing section 222A before, during and after the time that the web is stretched in the web stretching section 224B.

In some embodiments, the curing section 222 and the web stretching section 224 are staggered in the MD, such that one does not necessarily extend further in the MD, but one may begin and end before the other begins and ends, respectively. For example, in the web handling system 200C illustrated in FIG. 3C, a portion of the web stretching section 224C is coincident with a portion of the curing section 222C; however, a portion of the web stretching section 224C is located upstream of the curing section 222C, and a portion of the curing section 222C is located downstream of the web stretching section 224C. Alternatively, in the web handling system 200D illustrated in FIG. 3D, a portion of the web stretching section 224D is coincident with a portion of the curing section 222D; however, a portion of the curing section 222D is located upstream of the web stretching section 224D, and a portion of the web stretching section 224D is located downstream of the curing section 222D.

In some embodiments, the curing section 222 and the web stretching section 224 may extend to the same upstream or downstream location, but may end or begin, respectively, at a different position along the MD than the other. For example, in the web handling system 200E illustrated in FIG. 3E, the web stretching section 224E extends further in the MD than the curing section 222E, and the position at which the web stretching section 224E begins is upstream of the position at which the curing section 222E begins, but the position along the MD at which the web stretching section 224E ends is substantially the same as that of the curing section 222E. As a result, in the web handling system 200E, the coating is cured in the curing section 222E near the end of the web stretching section 224E. In such embodiments, for example, perhaps a web stretching process is employed in which the web is continually stretched and can then be released after it reaches a maximum stretch. Alternatively, in the web handling system 200F illustrated in FIG. 3F, the curing section 222F extends further in the MD than the web stretching section 224F, and the position at which the curing section 222F begins is upstream of the position at which the web stretching section 224F begins, but the position along the MD at which the curing section 222F ends is substantially the same as that of the web stretching section 224F. As a result, in the web handling system 200F, the coating can be pre-cured before the web stretching process begins.

Other configurations of the web handling system 200 that are capable of curing the coating on a web while the web is being stretched to form a multi-layer web of a desired curvature are possible and within the spirit and scope of the present disclosure. Such configurations can be understood by one of ordinary skill in the art based on the teachings of the present disclosure and are within the spirit and scope of the present disclosure.

The curing section 222 can include a variety of devices and/or equipment to provide the desired type of curing for a given coating or combination of coatings. For example, the curing section 222 can include a variety of curing devices, including, but not limited to, one or more of an X-ray tube, an electron beam source, a UV radiation source, a heater (e.g., an oven), and combinations thereof. The boundaries of the curing section 222 are not limited to the boundaries of the curing device or equipment. For example, the curing device can define a relatively narrow region in the MD of the web handling system 200, but the curing section 222 of the web handling system 200 can also include a portion of the web handling system 200 downstream of the curing device in which the coating continues to cure and develop stress in response to the curing device (e.g., continues to cure and develop stress in response to being irradiated with UV radiation). Furthermore, the curing section can include more than one curing device. For example, a coating can be pre-cured by a first curing device (e.g., a UV radiation source) and then fully cured by a second curing device (e.g., a heater or oven).

The web stretching section 224 can include a variety of web stretching assemblies that employ a variety of web stretching techniques, depending on the type of web(s) used, and the type of stretching that is needed. Because stretching the web induces a strain that matches, reduces or reverses the strain induced by curing a coating, the type of stretching needed often depends on the type of coatings that are being used.

Some coatings tend to shrink uni-directionally upon being cured and/or dried either because of the chemical make-up of the coating or because of an orientation introduced by the coating application process (e.g., some coatings include microreplicated structures from the coating application process that introduce an orientation in the machine direction or the cross-machine direction only). Some coatings, on the other hand, have a tendency to shrink in multiple directions. For example, some coatings have a tendency to shrink equally toward the center of the coating such that the coating shrinks equally in the machine direction and the cross-machine direction upon being cured. For coatings that tend to shrink uni-directionally, a uni-directional web stretching process may be sufficient. However, for coatings that tend to shrink in multiple directions, a multi-directional web stretching process may be necessary. The web stretching section 224 can include multiple web stretching assemblies to achieve the desired amount of strain in the desired directions.

FIGS. 4-9 illustrate a web handling system 300 according to one embodiment of the present disclosure. The web handling system 300 includes a curing section 322 and a web stretching section 324, both of which are coupled to and supported by a support 326. The support 326 includes a base 328 and a wall 330; however, it should be apparent to one of ordinary skill in the art that the support 326 can include any additional framework or other structures necessary to hold or provide support to the web handling system 300. The wall 330 separates the web handling system 300 into a front portion 332 and a rear portion 334. The front portion 332 of the web handling system 300 houses a web 301 and portions of the web handling system 300 that come into contact with the web 301. The rear portion 334 houses controllers, motors, or other devices (not shown) that drive, control and/or provide power to various portions of the web handling system 300. The wall 330 allows the web 301 and the portions of the web handling system 300 that contact the web 301 to be separated from any other devices or machinery that might produce debris or otherwise adversely affect the integrity of the web 301, as is well-known in the art.

The embodiment illustrated in FIGS. 4-9 does not include a coating section, but it should be understood that the web handling system 300 can include or be used with a variety of upstream and downstream processes, including an upstream coating section in which a coating 306 is applied to the web 301, such that a coated web 304 is supplied to the web handling system 300.

The curing section 322 of the web handling system 300 includes a UV radiation source 338 and any framework for supporting the UV radiation source (not shown). As mentioned above, the curing section 322 can include a variety of devices for curing the coating 306, and the UV radiation source 338 is shown by way of example only.

Figure 4:
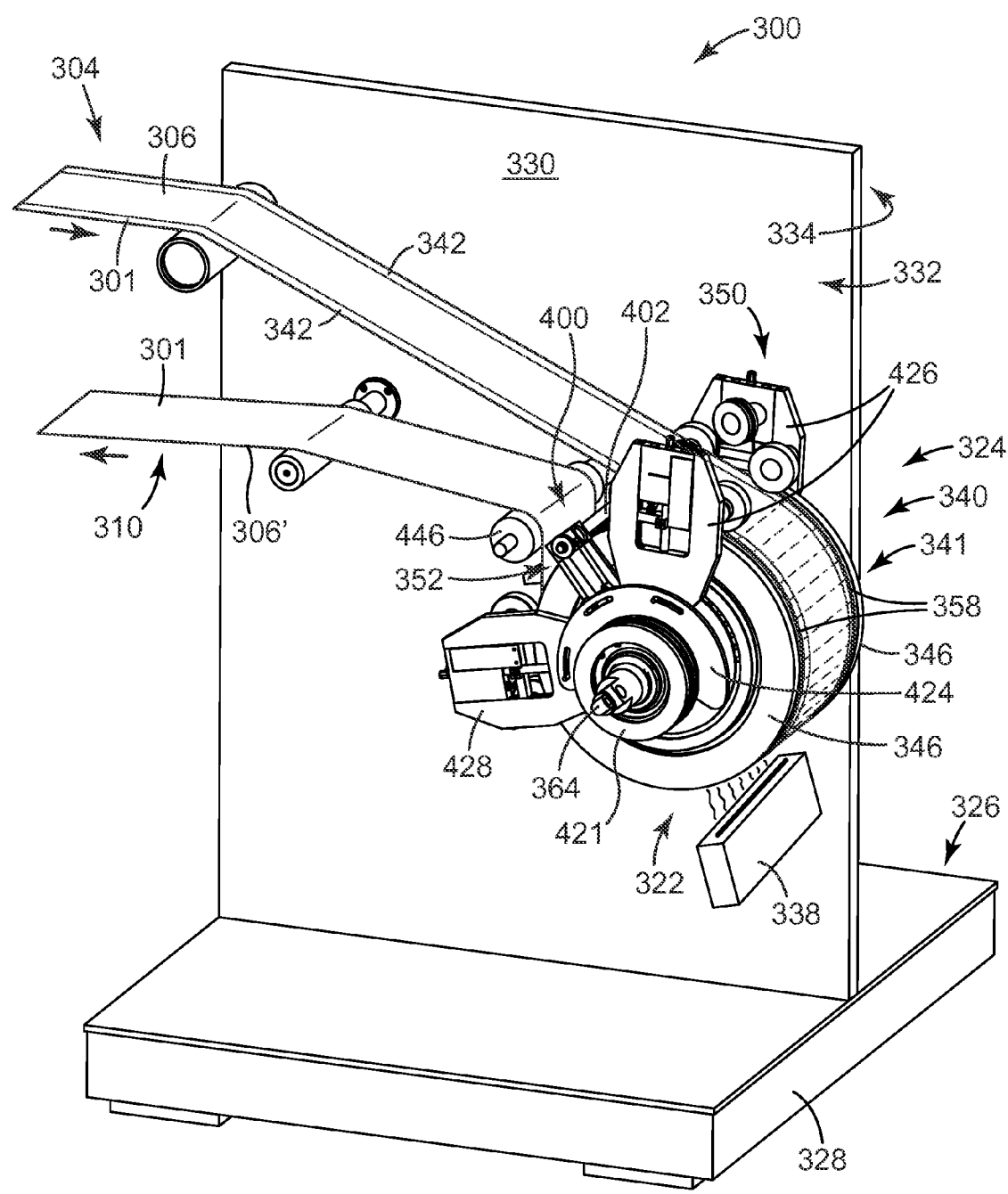
FIG. 4 is a side perspective view of a web handling system according to one embodiment of the present disclosure, the web handling system including a curing section and a web stretching section.
Figure 5:
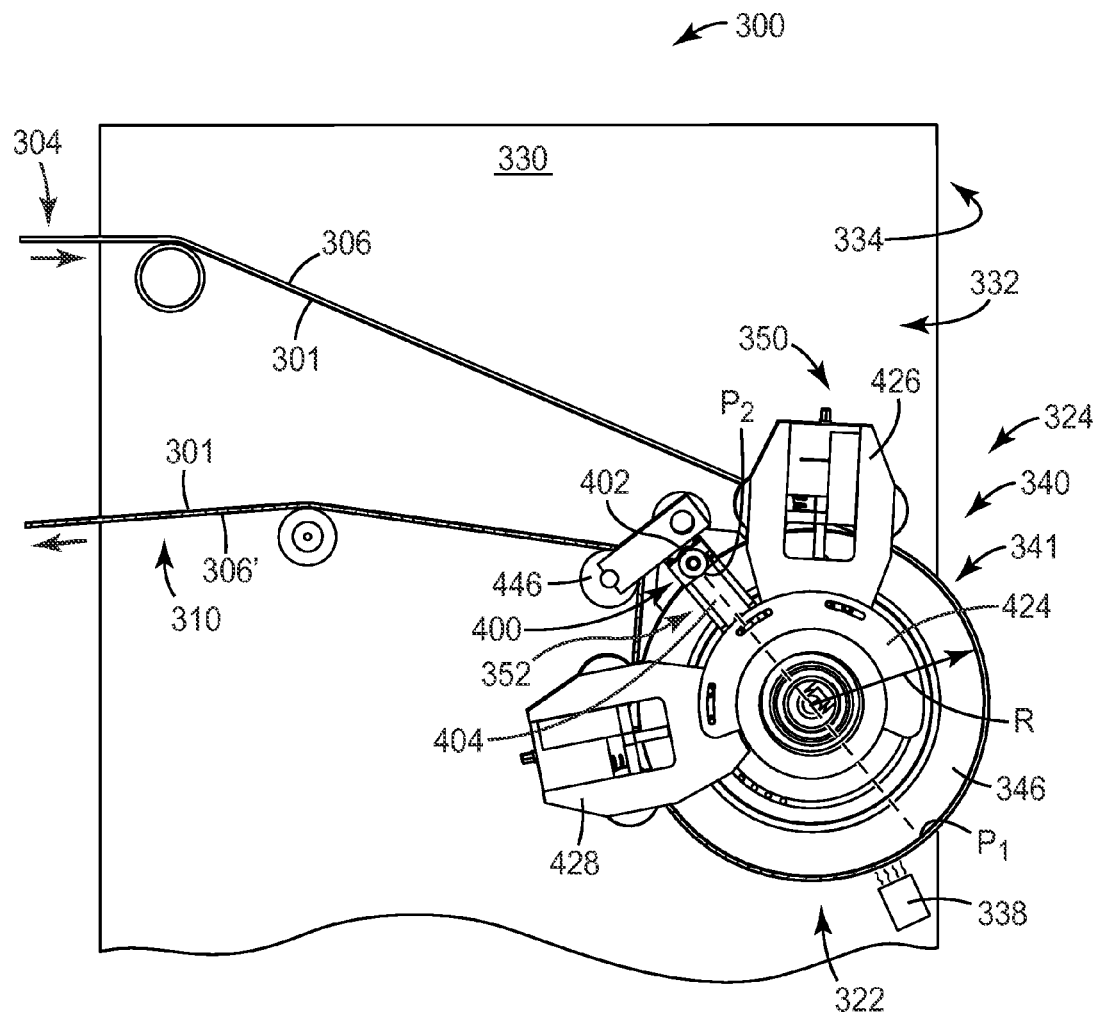
FIG. 5 is a side view of the web handling system of FIG. 4.

As shown in FIGS. 4 and 5, the web stretching section 324 is substantially coincident with the curing section 322, such that the web 301 is stretched when the coating 306 is cured, and particularly, the web 301 is stretched during the portion of the curing process at which a strain is induced by curing the coating 306.

By way of example only, the web stretching section 324 includes one web stretching assembly 340, which is described in greater detail below. The web stretching assembly 340 of the illustrated embodiment includes a tenter system 341. The tenter system 341 grips lateral ends 342 of the web 301 to stretch the web 301 in a cross-machine direction to induce a cross-machine-directional strain in the web 301. In some embodiments, the web 301 is also stretched in the machine direction by applying web line tension to the web 301 to induce a machine-directional strain in the web 301 substantially simultaneously to inducing a cross-machine directional strain in the web 301. Many coatings 306 are relatively fluid, so the web 301 can be stretched without disturbing the coating 306. In some embodiments, as shown in the embodiment illustrated in FIGS. 4-9, the coating 306 does not extend across the entire width of the web 301, such that the coating 306 is not applied to the lateral ends 342 of the web 301. This can facilitate gripping the lateral ends 342 of the web 301 and can avoid disturbing the coating 306 during the web stretching process.

The web line tension can be applied to the web 301 in at least the web stretching section 324 of the web handling system 300, but it could be applied to the web 301 substantially throughout its path in the web handling system 300. In some embodiments, the web line tension that is applied to the web 301 in the machine direction is sufficient to produce the desired machine direction strain in the web. The appropriate amount web line tension can depend on a number of factors, including the type of web used, but in some embodiments, the web line tension is at least about 3 pounds per linear inch (PLI; 525 N/m), particularly, at least about 5 PLI (875 N/m), and more particularly, at least about 10 PLI (1750 N/m).

By using the tenter system 341 in combination with the application of web line tension, the web 301 can be stretched biaxially to induce a strain in the web 301 in both the machine direction and the cross-machine direction. The strain induced by the web stretching section 324 is designed to match any strain that will be induced in the web 301 when the coating 306 is cured in the curing section 322. Thus, in some embodiments, the web stretching section 324 can apply one or both of machine-directional stress and cross-machine-directional stress to the web 301, depending on what strain is needed to reduce, match or reverse the strain induced by curing the coating 306.

The tenter system 341 includes a roller 344 (see FIGS. 7-8A) and two endplates 346 over which the web 301 is moved during travel through the tenter system 341. The tenter system 341 further includes a shaft 348 to which the roller 344 and endplates 346 are coupled for rotation about axis A-A (see FIG. 6). The tenter system 341 further includes a belt transport assembly 350 and an endplate tilt assembly 352.

In the embodiment illustrated in FIGS. 4-9, the roller 344 is in the form of a substantially uniform cylinder and includes an outer circumferential surface 345, and each of the endplates 346 is in the form of a substantially uniform ring and includes an outer circumferential surface 347. The roller 344 and the endplates 346 all have substantially the same radius R (see FIGS. 5 and 8), and each endplate 346 is positioned laterally with respect to the roller 344, such that each endplate 346 is on an opposite lateral end of the roller 344 from one another.

The tenter system 341 is laterally symmetric. One lateral side is described below for simplicity and clarity, but it should be understood that such description applies to both lateral sides of the tenter system 341. When necessary, both lateral sides are described, but when one side is described, it should be assumed that the description applies equally to the other lateral side of the tenter system 341.

A first (medial) circumferential groove 354 and a second (lateral) circumferential groove 356 are formed in the outer circumferential surface 347 of the endplate 346. The first circumferential groove 354 is spaced a lateral distance from the second circumferential groove 356. Each of the first and second circumferential grooves 354, 356 is dimensioned to receive a belt 358.

Figure 6:
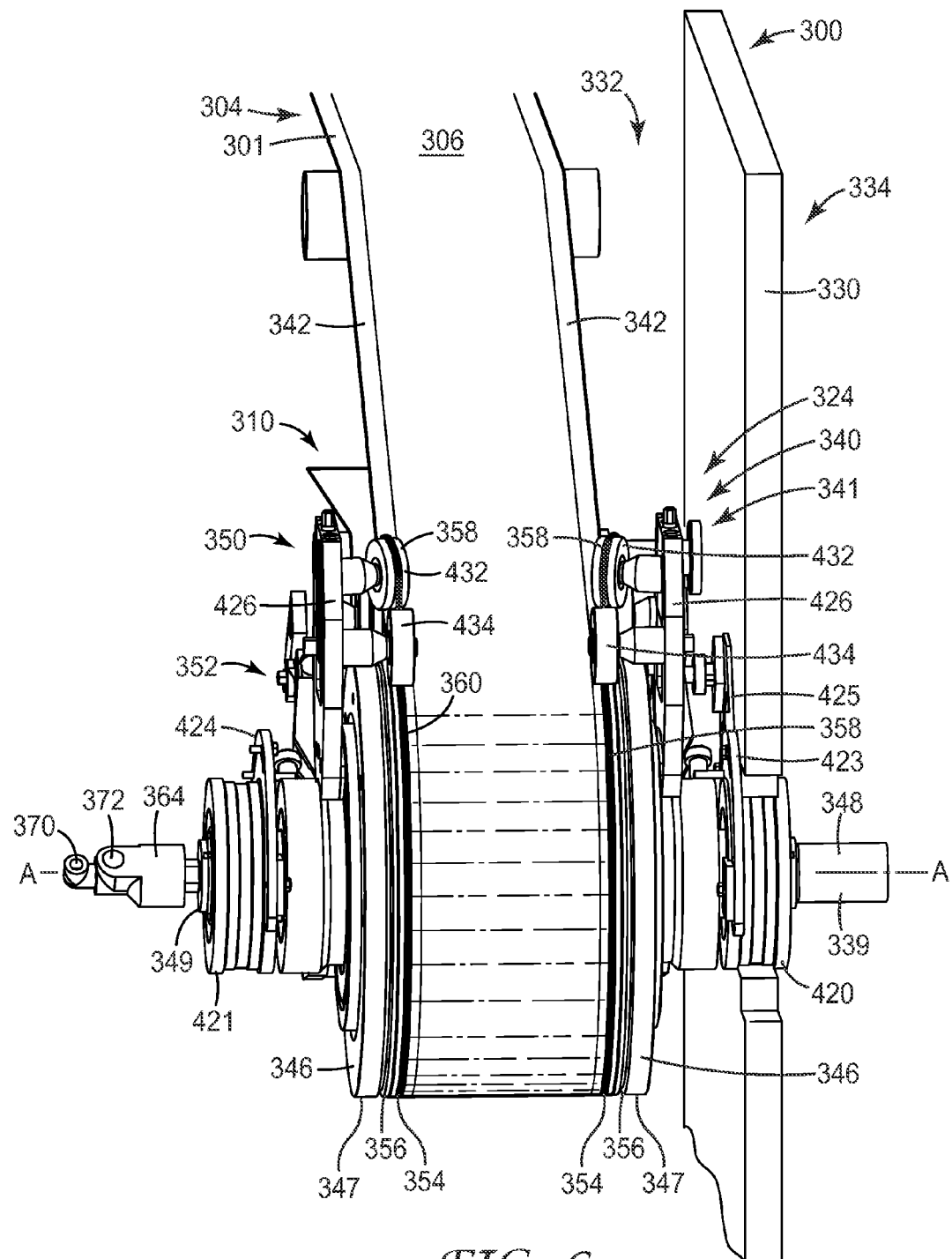
FIG. 6 is a close-up front perspective view of a portion of the web handling system of FIGS. 4 and 5.

As shown in FIGS. 4 and 6, as the web 301 contacts the roller 344 and endplates 346, the lateral ends 342 of the web 301 are pinned between the belt 358 and the first circumferential groove 354, and the web 301 remains pinned between the belt 358 and the first circumferential groove 354 as it travels around a portion of the roller 344 and endplates 346.

The endplate 346 is oriented at an angle with respect to the roller 344 by the endplate tilt assembly 352, which will be described in greater detail below. In addition, the endplate 346 is oriented at an angle (i.e., a non-perpendicular angle) with respect to the axis A-A of rotation. When the endplate 346 is not tilted with respect to the roller 344, the endplate 346 is spaced a lateral distance from the end of the roller 344 and is substantially parallel to the end of the roller 344. Because the endplate 346 is substantially circular (i.e., has a substantially constant radius) and substantially flat, tilting the endplate 346 with respect to the roller 344 causes half of the endplate 346 to be positioned laterally further from the roller 344 and half of the endplate 346 to be positioned laterally closer to the roller 344. As a result, the endplate 346 includes a first point $P_1$ (see FIG. 5) at which it is spaced a maximal lateral distance from the roller 344, and a second point $P_2$ (see FIG. 5) diametrically opposite (i.e., 180 degrees from) the first point $P_1$ at which the endplate 346 is spaced a minimal lateral distance from the roller 344.

Figure 7:
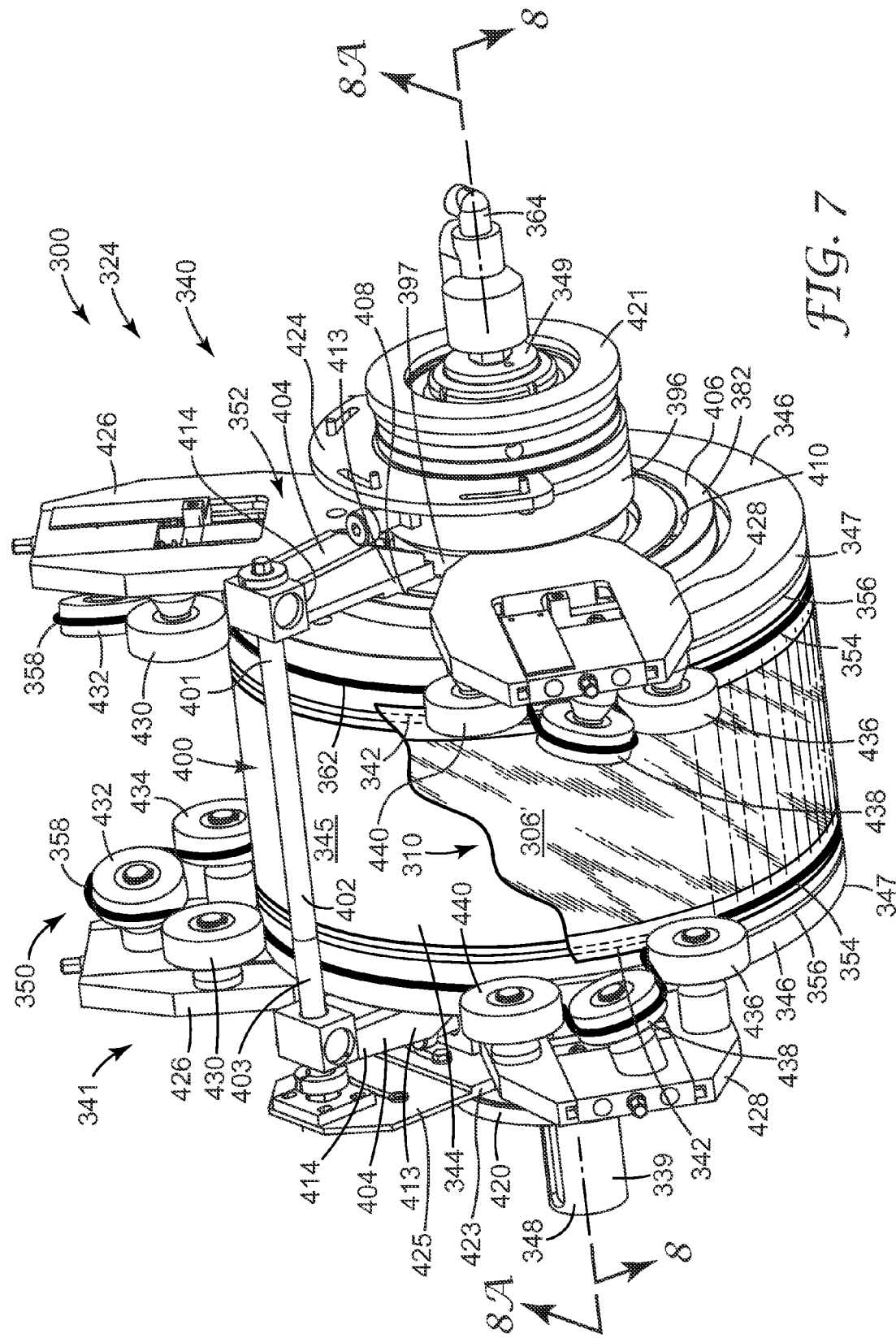
FIG. 7 is a rear perspective view of the web stretching section of the web handling system of FIGS. 4-6.
Figure 8:
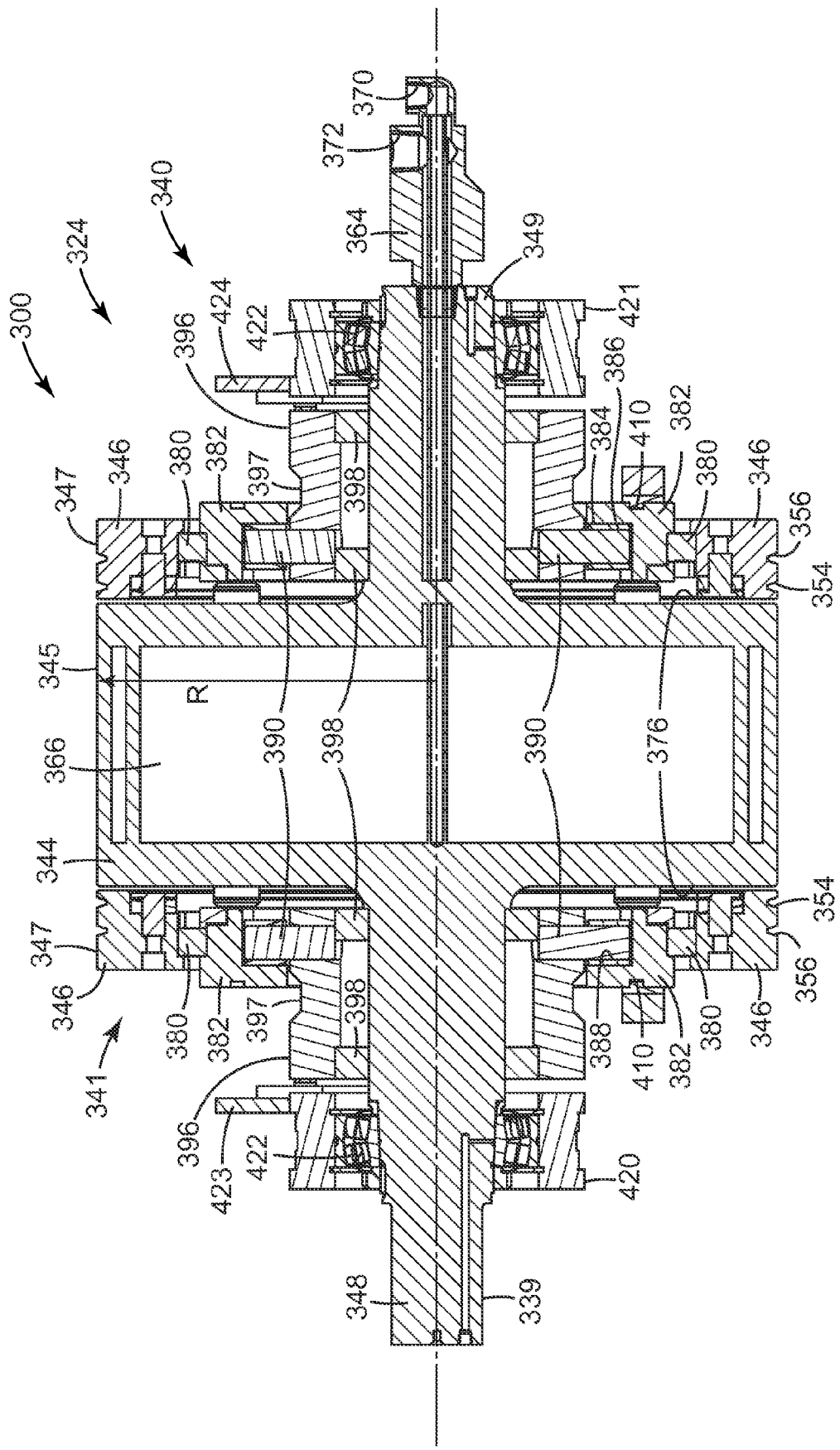
FIG. 8 is a cross-sectional view of the web stretching section of FIG. 7, taken along line 8-8 of FIG. 7.
Figure 8A:
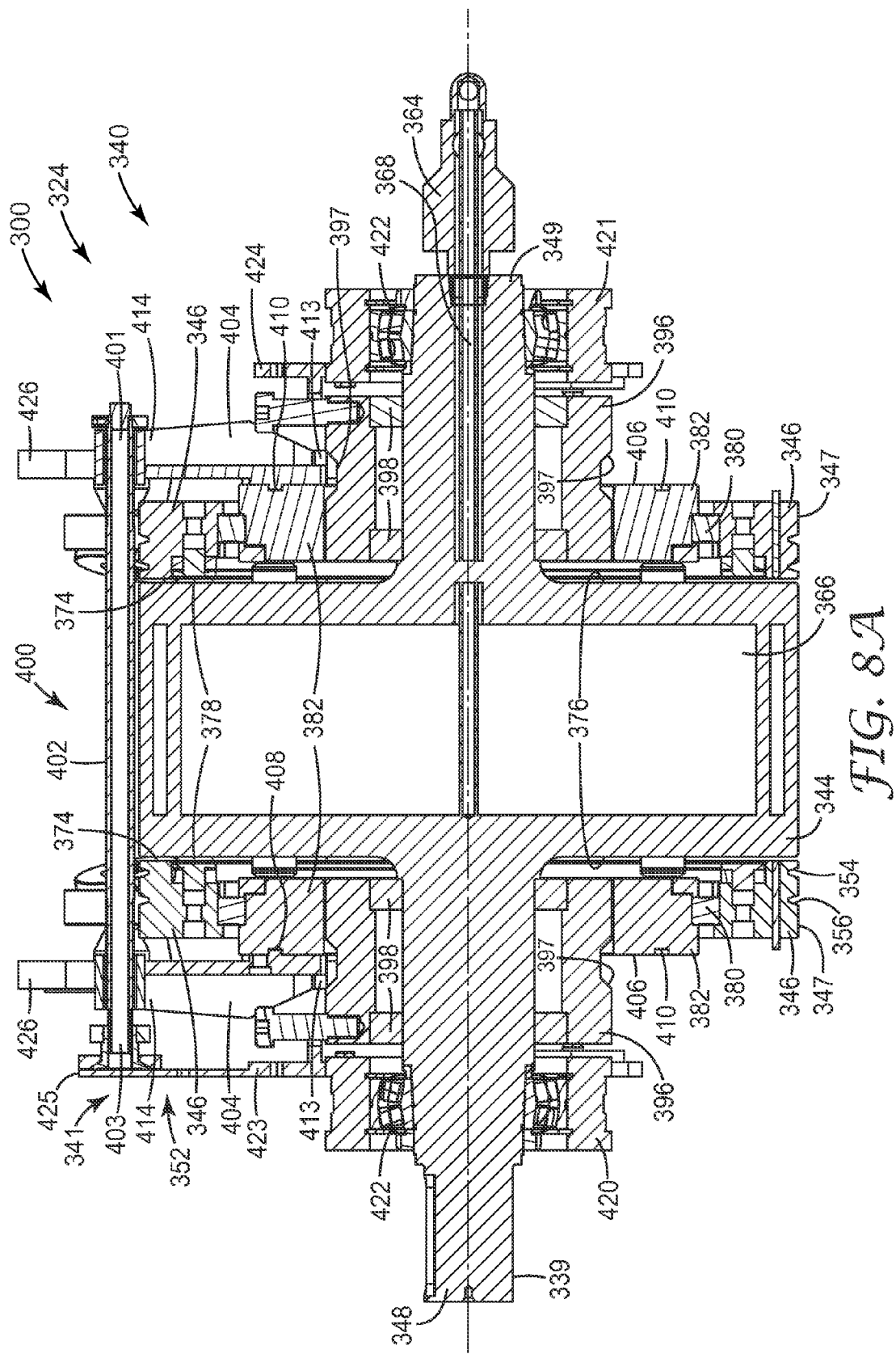
FIG. 8A is a cross-sectional view of the web stretching section of FIG. 7, taken along line 8A-8A of FIG. 7.
Figure 9:
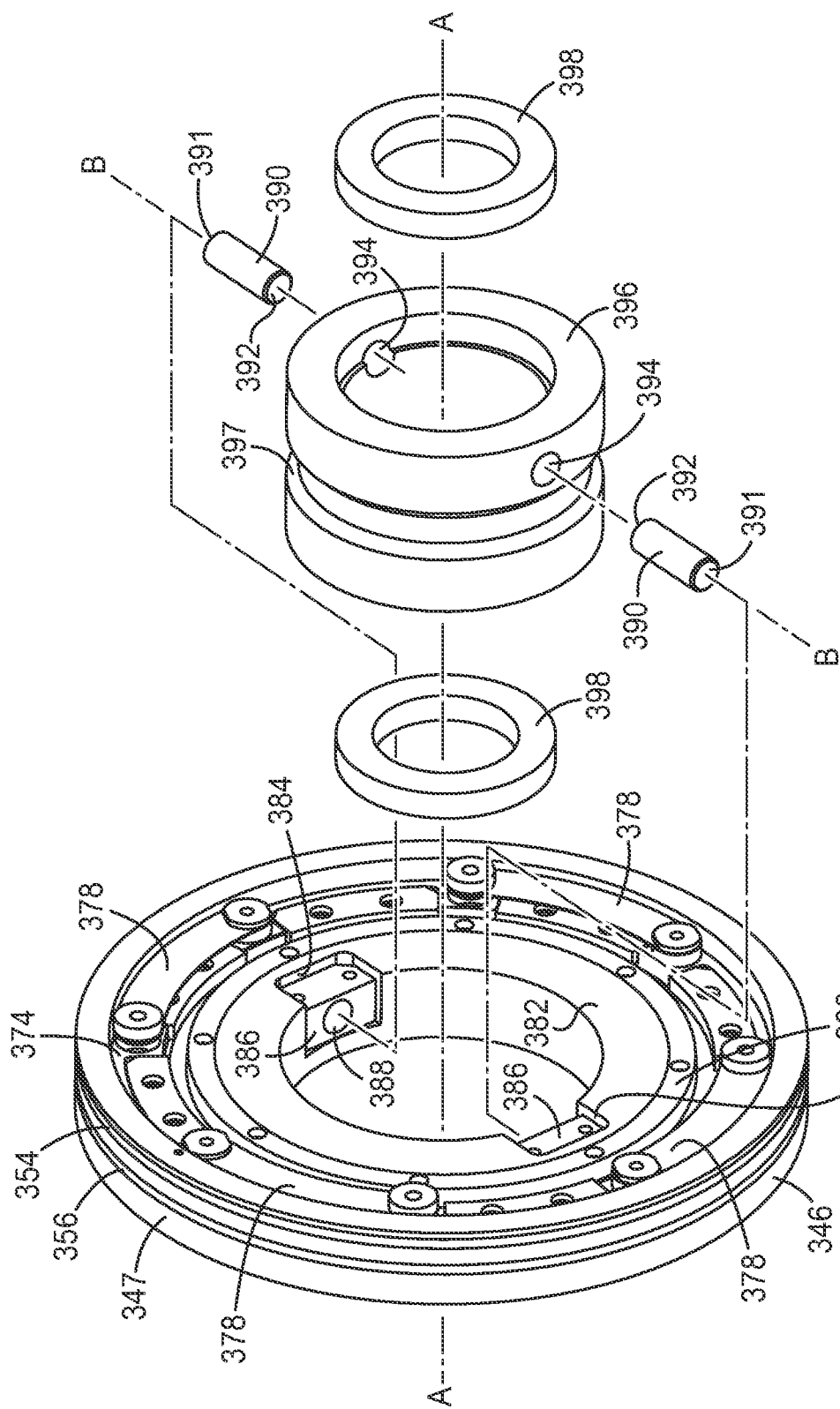
FIG. 9 is an exploded view of a portion of the web stretching section of FIGS. 7 and 8 and illustrates a portion of an endplate tilt assembly.

In the embodiment illustrated in FIGS. 4-9, as shown in FIGS. 8 and 8A, the roller 344 is integrally formed with the shaft 348. However, one of ordinary skill in the art will recognize that other configurations are possible and that the roller 344, the endplates 346 and the shaft 348 can be discrete parts that are rotatable together about the axis A-A. The endplate 346 includes an inner medial surface 374 that is coupled to an outer lateral surface 376 of the roller 344 via one or more flexure connectors 378 (see FIGS. 8-9). The flexure connectors 378 allow the endplate 346 to be moved or pivoted laterally outwardly from the roller 344 while remaining coupled to the roller 344 such that the endplate 346 rotates about the axis A-A with the roller 344 and the shaft 348. As shown in FIG. 9, the embodiment illustrated in FIGS. 4-9 includes four arcuate flexure connectors 378, which are positioned circumferentially about the endplate 346 adjacent the medial surface 374 of the endplate 346 and the outer lateral surface 376 of the roller 344. Other numbers and shapes of flexure connectors 378 are possible and within the spirit and scope of the present disclosure.

As shown in FIGS. 8, 8A and 9, the endplate 346 is rotatable about the axis A-A about a ring bearing 380, which is positioned to rotatably isolate the endplate 346 from the endplate tilt assembly 352. The endplate tilt assembly 352 includes a ring 382 about which the endplate 346 rotates. The ring 382 includes two diametrically opposed recesses 384, which are each dimensioned to receive an insert 386. Each insert 386 includes a pin recess 388 that is dimensioned to receive a first end 391 of a pin 390, such that the ring 382 is pivotally movable about the pin 390, and particularly, about an axis B-B of rotation. As shown in FIG. 9, the axis A-A is substantially perpendicular to the axis B-B. A second end 392 of each of the pins 390 is dimensioned to be received in a recess 394 of a collar 396. The collar 396 does not rotate, and is rotationally isolated from the shaft 348 by two ring bearings 398. The collar 396 is also rotationally isolated from the endplate 346 by the ring bearing 380. The collar 396 further includes an outer circumferential groove 397 to which other components of the tenter system 341 (e.g., components of the endplate tilt assembly 352) can be coupled. The collar 396, the ring 382, and the pins 390 are inhibited from rotation about axis A-A, as described below.

The endplate tilt assembly 352 further includes a tilt actuator, or pivot actuator, 400. As shown in the embodiment illustrated in FIG. 7, the tilt actuator 400 of the illustrated embodiment includes a tie rod 402 and two brackets 404. A first end 401 of the tie rod 402 is coupled to one bracket 404, and a second end 403 of the tie rod 402 is coupled to the other bracket 404. The brackets 404 are each coupled to an outer lateral surface 406 of the adjacent ring 382. Each bracket includes a proximal end 413 and distal end 414. As shown in FIGS. 7 and 8A, the proximal end 413 is shaped and dimensioned to be received in the outer circumferential groove 397 of the adjacent collar 396. In addition, the proximal end 413 includes a medial projection 408 that is dimensioned to be received in an annular groove 410 defined in the outer lateral surface 406 of the ring 382.

As shown in FIG. 7, each bracket 404 extends radially outwardly from the ring 382. Distal ends 414 of the brackets 404 are connected by the tie rod 402. As the tie rod 402 is shortened (i.e., as the first end 401 and the second end 403 of the tie rod 402 are brought closer together), the distal ends 414 of the brackets 404 are moved closer together, which causes the ring 382 to pivot about the pins 390, and particularly, about the axis B-B. The endplate 346, which is coupled to the ring 382, in turn pivots about the pins 390, such that the endplate 346 is spaced a maximal lateral distance from the roller 344 at the first point $P_1$, which is diametrically opposite the bracket 404 and tie rod 402. In addition, the second point $P_2$ (see FIG. 5) at which the endplate 346 is spaced a minimal lateral distance from the roller 344 is located along the same radial line as the tie rod 402 relative to the endplate 346. By moving the tilt actuator 400 circumferentially about the ring 382, the locations of the first and second point $P_1$ and $P_2$ can be moved. In the embodiment illustrated in FIGS. 4-9, the tie rod 402 and the second point $P_2$ are positioned at approximately ten o'clock on the endplate 346 when viewed from the side (see FIG. 5), and the first point $P_1$ is positioned at approximately four o'clock on the endplate 346 when viewed from the side.

Figure 10:
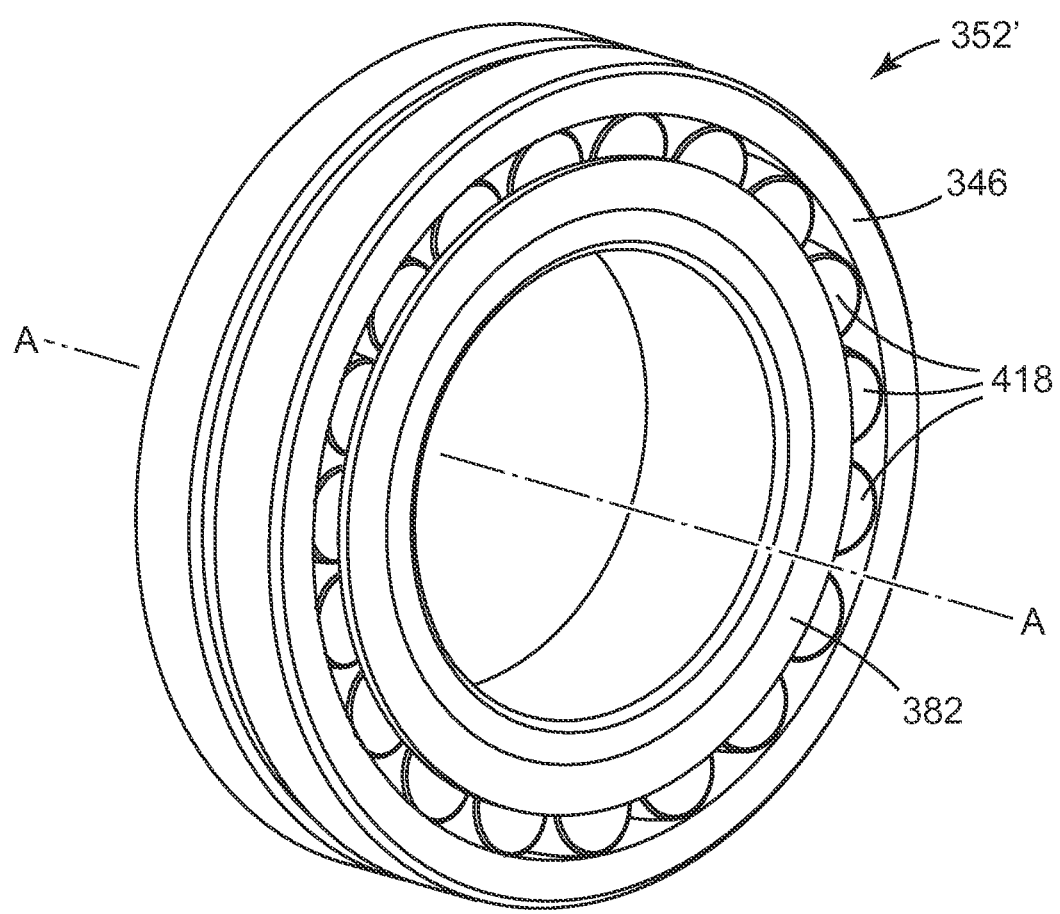
FIG. 10 is a perspective view of an endplate tilt assembly according to another embodiment of the present disclosure.

In the embodiment illustrated in FIGS. 4-9, the endplate tilt assembly 352 employs a tie rod 402 to cause the ring 382, and in turn the endplate 346, to pivot about the pins 390. Other devices and mechanisms can be used to tilt or pivot the endplate 346 relative to the roller 344, the shaft 348, and/or the axis of rotation A-A. For example, in some embodiments, as shown in FIG. 10, an alternative endplate tilt assembly 352' includes a plurality of spherical roller bearings 418 that are coupled, either directly or indirectly, between the endplate 346 and a fixed (i.e., non-rotating) portion of the tenter system 341, such as the ring 382, as shown in FIG. 10. The spherical roller bearings 418 allow the endplate 346 to rotate about the axis A-A and pivot laterally with respect to the ring 382, and in turn, to pivot laterally with respect to the roller 344 to a position in which the endplate 346 is oriented at an angle (i.e., a non-perpendicular angle) with respect to the axis A-A. Still other suitable endplate tilt assemblies are conceivable and within the spirit and scope of the present disclosure.

The tenter system 341 further includes a first mounting collar 420 and a second mounting collar 421. The first mounting collar 420 couples the remainder of the tenter system 341 to the wall 330, as shown in FIG. 6. The second mounting collar 421 allows the web handling system 300 to be coupled to an outboard portion (not shown) of the support 326. As shown in FIGS. 8 and 8A, the first and second mounting collars 420, 421 are each rotationally isolated from the shaft 348 by spherical roller bearings 422, and do not rotate.

As shown in FIGS. 4-8A, first and second flanges 423, 424 are coupled to the first and second mounting collars 420, 421, respectively. The first and second flanges 423, 424 are also coupled to the endplate tilt assembly 352 and allow the endplate tilt assembly 352 to be coupled to the support 326 for inhibition against rotation. Particularly, as shown in FIG. 6, the first flange 423 is coupled to the wall 330, and allows the endplate tilt assembly 352 to be coupled to the wall 330. The second flange 424 allows the endplate tilt assembly 352 to be coupled to an outboard portion of the support 326. The first flange 423 includes an extension 425 that is also coupled to the wall 330 and to the second end 403 of the rod 402 of the endplate tilt assembly 352. As a result, the first and second flanges 424 allow the endplate tilt assembly 352 to be coupled to the support 326, and particularly, allow the collar 396, the ring 382, and the pins 390 to be rotationally isolated from the endplate 346 and the shaft 348.

A first end 339 of the shaft 348 extends through the wall 330 and allows motors or other driving means to be coupled to the tenter system 341, as shown in FIG. 6. A rotary union 364 is coupled to a second end 349 of the shaft 348. The rotary union 364 is in fluid communication with a chamber 366 of the roller 344 via a lumen 368 of the shaft 348 (see FIGS. 8 and 8A). A coolant (e.g., water) can be directed into and about the chamber 366 via the rotary union 364 to inhibit the roller 344 from overheating, and particularly, to maintain the outer circumferential surface 345 of the roller 344 that contacts the web 301 at a desired temperature. Although other configurations are possible, the illustrated rotary union 364 includes an inlet 370 and an outlet 372. Cooled coolant is directed into the chamber 366 via the lumen 368. The coolant receives heat from the roller 344 and is directed out of the chamber 366 and out of the outlet 372 of the rotary union 364 to be re-cooled by a cooling or refrigeration system (not shown).

As mentioned above, as the web 301 contacts the roller 344 and endplates 346, the lateral ends 342 of the web 301 are pinned between the belt 358 and the first circumferential groove 354 in the outer circumferential surface 347 of the endplate 346. The web 301 remains pinned between the belt 358 and the first circumferential groove 354 until a circumferential position at which the web 301 leaves the roller 344 and endplates 346 for downstream processes. To allow the web 301 to leave the roller 344 and endplates 346, the belt 358 needs to release the web 301 from being pinned between the belt 358 and the first circumferential groove 354. This can be accomplished in a variety of ways. One exemplary solution is to employ the belt transport assembly 350, which is illustrated in FIGS. 4-7 and described below.

As shown in FIGS. 4-7, the belt transport assembly 350 is configured to continuously move the belt 358 about the endplate 346, while allowing the belt 358 to shift between the first and second circumferential grooves 354, 356 in the endplate 346. The first and second circumferential grooves 354, 356 are spaced a lateral distance apart such that when the belt 358 is positioned in the second circumferential groove 356, the belt 358 is not contacting the lateral end 342 of the web 301. In other words, the first and second circumferential grooves 354, 356 are positioned such that the ultimate lateral edge of the web 301 is located between the first and second circumferential grooves 354, 356 when the web 301 is moved about the roller 344 and endplates 346.

As shown in FIGS. 6 and 7, allowing the belt 358 to shift between the first and second circumferential grooves 354, 356 allows the belt 358 to alternate, respectively, between a first position 360 in which the belt 358 is in contact with the lateral end 342 of the web 301 and a second position 362 in which the belt 358 is not in contact with the lateral end 342 of the web 301. In other words, the belt transport assembly 350 transports the belt 358 and "jumps" the belt 358 between the first circumferential groove 354 to the second circumferential groove 356. Particularly, the belt transport assembly 350 illustrated in FIGS. 4-7 jumps the belt 358 from the first circumferential groove 354 to the second circumferential groove 356 at one point about the endplate 346, and jumps the belt 358 back to the first circumferential groove 354 at another point about the endplate 346.

The belt transport assembly 350 can employ a variety of devices and mechanisms to accomplish the task of jumping the belt 358 between the first and second circumferential grooves 354, 356. In the embodiment illustrated in FIGS. 4-7, the belt transport assembly 350 includes a first arm 426 and a second arm 428 (i.e., on either side of the tenter system 341) that are coupled to and extend radially outwardly from the collar 396, adjacent the endplate 346. In the embodiment illustrated in FIGS. 4-7, the first arm 426 is positioned at about a twelve o'clock position (when viewed from the perspective of FIG. 5), and the second arm 428 is positioned at about an eight o'clock position. As such, the first arm 426 and the second arm 428 are separated by an angle of less than about 120 degrees and greater than about 90 degrees. Other arrangements and orientations of the first and second arms 426, 428 are possible, and can depend at least partially on where the web 301 enters the roller 344, which direction the web 301 is coming from, which direction the web 301 needs to exit the roller 344 for downstream processes, and how much stretching of the web 301 and curing of the coating 306 is needed, which can depend on a number of factors, including the type of web 301 and coating 306 used.

With reference to FIG. 7, the first arm 426 includes a first roller 430 in a first circumferential position, a second roller 432 spaced radially outwardly and positioned clockwise relative to the first roller 430, and a third roller 434 spaced radially inwardly and clockwise relative to the second roller 432. The first and third rollers 430, 434 are positioned such that they contact the outer circumferential surface 347 of the endplate 346. The second arm 428 includes a first roller 436, a second roller 438, and a third roller 440 arranged in a similar configuration as those of the first arm 426. Each of the second rollers 432, 438 is canted such that its axis of rotation is oriented at an angle with respect to the adjacent first and third rollers 430, 436 and 434, 440, respectively. In some embodiments, as shown in FIG. 7, the second roller 432, 438 can be canted at an angle of about 30 degrees with respect to the first and third rollers 430, 436 and 434, 440, respectively. Other angles of orientation can be used, and can be at least partially determined by the distance between the first and second circumferential grooves 354, 356, the size (i.e., thickness) of the belt 358, and the diameter of the rollers 432, 438.

The first arm 426 and the second arm 428 accomplish opposite tasks. The first arm 426 is configured to move the belt 358 from its second position 362 in the second circumferential groove 354 to its first position 360 in the first circumferential groove 354. The second arm 428, on the other hand, is configured to move the belt 358 from its first position 360 in the first circumferential groove 352 to its second position 362 in the second circumferential groove 356. As a result, the first roller 430 of the first arm 426 is located adjacent the endplate 346 above the second circumferential groove 356, the second roller 432 of the first arm 426 is canted inwardly, and the third roller 434 is positioned inwardly (i.e., medially) with respect to the first roller 430, such that the third roller 434 is adjacent the endplate 346 above the first circumferential groove 354. On the contrary, the first roller 436 of the second arm 428 is located adjacent the endplate 346 above the first circumferential groove 354, the second roller 438 is canted outwardly, and the third roller 440 is positioned outwardly (i.e., laterally) with respect to the first roller 436, such that the third roller 440 is adjacent the endplate 346 above the second circumferential groove 356.

With reference to FIGS. 6 and 7, at about an eleven o'clock position on the roller 344 and endplates 346 (when viewed from the perspective of FIG. 5), the belt 358 is in its second position 362 and positioned within the second circumferential groove 356 of the endplate 346. As such, the belt 358 is not in contact with the web 301 at this point. The belt 358 is directed under the first roller 430 of the first arm 426 of the belt transport assembly 350. After passing under the first roller 430, the belt 358 passes up to and over the second roller 432, which is grooved to inhibit the belt 358 from being pulled off of the second roller 432. By passing over the second roller 432, the belt 358 is removed from the endplate 346 and directed about 30 degrees inwardly (i.e., medially with respect to the roller 344 and endplate 346). The belt 358 then passes down to and under the third roller 434 and into the nip formed between the third roller 436 and the outer circumferential surface 347 of the endplate 346, such that the belt 358 is directed into the first circumferential groove 354. Positioning the belt 358 within the first circumferential groove 354 positions the belt 358 in its first position 360, in which the belt 358 is in contact with the lateral end 342 of the web 301.

The belt 358 is then directed about the endplates 346, while remaining in contact with the web 301, to the second arm 428 of the belt transport assembly 350. The belt 358 is directed under the first roller 436 of the second arm 428 and then up to and over the second roller 438, which can be grooved, similar to the second roller 432 of the first arm 426. By passing over the second roller 438, the belt 358 is removed from the endplate 346 and directed about 30 degrees outwardly (i.e., laterally with respect to the roller 344 and endplate 346). The belt 358 then passes down to and under the third roller 440 and into the nip formed between the third roller 440 and the outer circumferential surface 347 of the endplate 346, such that the belt 358 is directed into the second circumferential groove 356. After passing under the third roller 440, the belt 358 returns back into its second position 362, in which the belt 358 is not in contact with the web 301, and so on.

Other belt transport assemblies are possible and can be used without departing from the spirit and scope of the present disclosure. For example, the outer circumferential surface 347 of the endplate 346 can include one circumferential groove that is dimensioned to receive the belt 358. In addition, the belt 358 can be routed around one or more additional rollers or pulleys positioned adjacent the endplate 346 that define a belt track. In such embodiments, the belt 358 moves along the circumferential groove over a portion of the endplate 346 corresponding to the portion over which the web 301 should be stretched. The belt 358 is then removed from the circumferential groove at a point where the web 301 should no longer be stretched and is directed to the belt track. The belt 358 continues around the additional rollers or pulleys along the belt track until it is re-positioned in the circumferential groove at the position where the web 301 should be pinned.

In operation, with reference to FIGS. 4-7, the coated web 304 is directed from upstream processes to the web handling system 300, and particularly, to the web stretching section 324 and the curing section 322. The coated web 304 is moved toward the tenter system 341, and the web 301 contacts the roller 344 and the endplates 346 at about an eleven o'clock position (see FIG. 5). As the web 301 contacts the roller 344 and endplates 346, the web 301 enters the nip formed between the first roller 430 of the first arm 426 of the belt transport assembly 350 and the outer circumferential surface 347 of the endplate 346. The ultimate lateral edge of the web 301 is positioned between the first and second circumferential grooves 354, 356 of the endplate 346, such that the web 301 is not yet in contact with the belt 358. As the coated web 304 moves clockwise about the roller 344 and endplates 346, the lateral ends 342 of the web 301 are pinned at about a twelve o'clock position between the belt 358 and the first circumferential groove 354 under the third roller 434 of the first arm 426 of the belt transport assembly 350.

Because the endplate tilt assembly 352 of the illustrated embodiment is configured in the manner described above and illustrated in FIGS. 4-9, the endplates 346 are tilted with respect to the roller 344 such that the endplates 346 have a maximal lateral spacing from the roller 344 at the first point $P_1$ (see FIG. 5). Due to the lateral symmetry of the tenter system 341, the endplates 346 are both directed laterally outwardly from the roller 344 at the first point $P_1$. As the coated web 304 is moved by the roller 344 and endplates 346 in a clockwise direction, the lateral ends 342 of the web 301 remain gripped between the belt 358 and the first circumferential groove 354 in the endplates 346, and the web 301 is stretched in a cross-machine direction, which induces a strain (e.g., an elastic strain) in the web 301. Cross-machine directional stretching of the web 301 is indicated in FIGS. 4 and 6 by phantom lines drawn across the width of the coated web 304. The web 301 reaches a point of maximal cross-machine directional stain when it passes over the first point $P_1$ on the endplate 346. After passing the first point $P_1$, the web 301 is still being stretched to some extent but has begun to rebound back to its original, unstretched state.

As shown in FIG. 5, soon after passing the first point $P_1$, the coated web 304 is directed into the curing section 322 of the web handling system 300. The UV radiation source 338 irradiates the coated web 304 with UV radiation, causing the coating 306 to begin to cure. The coating 306 can continue to cure as the coated web 304 is directed around the roller 344 and endplates 346. The coating 306 is shown schematically in FIG. 5 in its uncured state (identified by reference numeral 306) and its cured (or partially cured) state 306' (see also FIG. 7). Curing the coating 306 forms a multi-layer web 310 that comprises the cured coating 306' coupled to the web 301.

After passing through the web stretching section 324 and the curing section 322, the multi-layer web 310 is directed under the first roller 436 of the second arm 428 of the belt transport assembly 350 (in some embodiments, the coating may still be curing at this point). As shown in FIG. 7, after passing under the first roller 436, the belt 358 is directed out of the first circumferential groove 354 of the endplate 346, and the lateral ends 342 of the web 301 are released from being pinned between the belt 358 and the first circumferential groove 354. Accordingly, the lateral ends 342 of the web 301 are released from the belt 358 at about an eight o'clock position on the endplate 346. If the web 301 has not fully returned to its original, unstretched state by the time it is released from the belt 358, the web 301 will continue rebounding after it is released from the belt 358. The multi-layer web 310 having a desired curvature is then released from the roller 344 and endplates 346 at about a nine o'clock position and passed over a downstream roller 446 that is positioned to direct the resulting multi-layer web 310 away from the web stretching section 324 and the curing section 322 toward downstream processes.

The following working examples are intended to be illustrative of the present disclosure and are not meant to be limiting.

EXAMPLES

Example 1

A web stretching section including a biaxial tenter system similar to the tenter system shown in FIGS. 4-9 was mounted to a HIRANO MULTI COATER™ Model M-200 coating machine, commercially available from Hirano Tecseed Company, Ltd. of Nara, JP. A 10-inch (25.4 cm) wide roll of 0.56 mil (14 μm) thick polyethylene terephthalate (PET) film, commercially available from DuPont Teijin Films of Hopewell, Va. was fed to the tenter system as depicted in FIG. 4. An upstream coating section included a coating die generally of the type described in U.S. Pat. No. 5,639,305. A conventional pump was used to feed a coating fluid to the coating die. The coating composition was a photopolymerizable dispersion with solids consisting mainly of 51% by weight pentaerythritoltriacrylate ("SR-444" from Sartomer Company, Inc. of Exton, Pa.) and 37% by weight reaction product of colloidal silica ("Nalco 2327" from Nalco Company of Naperville, Ill.) and 3-trimethoxysilylpropyl methacrylate ("A174" from Momentive Performance Materials of Wilton, Conn.). Other solid additives in PETA were 8% by weight n,n-dimethylacrylamide ("NNDMA" from Sigma-Aldrich Company of St. Louis, Mo.), 2.4% by weight 1-hydroxy-cyclohexyl-phenylketone ("Irgacure 184 from Ciba Specialty Chemicals of Newport, Del.), 2% by weight bis (pentamethyl-1,2,2,6,6 piperidinyl-4) decanoate ("Tinuvin 292" from Ciba Specialty Chemicals of Newport, Del.), 50 ppm phenothiazine (Cytec Industries, Inc. of West Patterson, N.J.) and 400 ppm 2,6-di-tert-butyl-p-cresol (Merisol USA, LLC of Houston, Tex.). The coating composition was prepared at 30 wt. % solids from a dispersion of approximately 50 wt. % solids in a 2-propanol diluent. Specifically, the coating composition was prepared according to column 10, lines 25-39 and Example 1 of U.S. Pat. No. 5,677,050 to Bilkadi, et. al, which is incorporated herein by reference.

A curing section was provided adjacent to and substantially coincident with the web stretching section. The curing section included a UV radiation source, commercially available from Fusion UV Systems, Inc. of Gaithersburg, Md. In a first, control, experiment, the described coater was operated to advance the PET film at a line speed of 3 m/min. The coating die was adjusted to dispense a layer of the coating fluid that would cure to a 10-μm thick coating. The coating was cured by the curing section by the application of UV radiation. The tentering function was not engaged, and the web line tension was 10 lbs (44 N; i.e., 1 PLI (175 N/m) based on the 10-inch-wide (0.254-m-wide) web).

Figure 11:
FIG. 11 is a digital photograph of multi-layer webs formed according to Examples 1 and 2.

At the conclusion of the coating and curing, a 2" inch (5 cm) disc was die cut from the sheet and allowed to take on its natural shape. It was observed that the disc curled upon itself into a tight cylinder of about a 3-mm radius, as shown on the right-hand side of FIG. 11.

Example 2

A coating experiment was performed generally as described in Example 1, except that the tentering function of the tenter system was engaged to provide a strain of 0.9% in the cross-machine direction, and a web line tension of 31 lbs (138 N; 3.1 PLI (543 N/m) based on the 10-inch-wide (0.254-m-wide) web) was used to provide a 0.9% strain (0.009 in./in.) in the machine direction. The web was stretched in the machine direction and the cross-machine direction during curing of the coating, and particularly, during coating stress development. At the conclusion of the coating and curing, when the 2" inch (5 cm) disc was die cut from the sheet and allowed to take on its natural shape, it was observed that the disc lay substantially flat, as shown on the left-hand side of FIG. 11.

Figure 13:
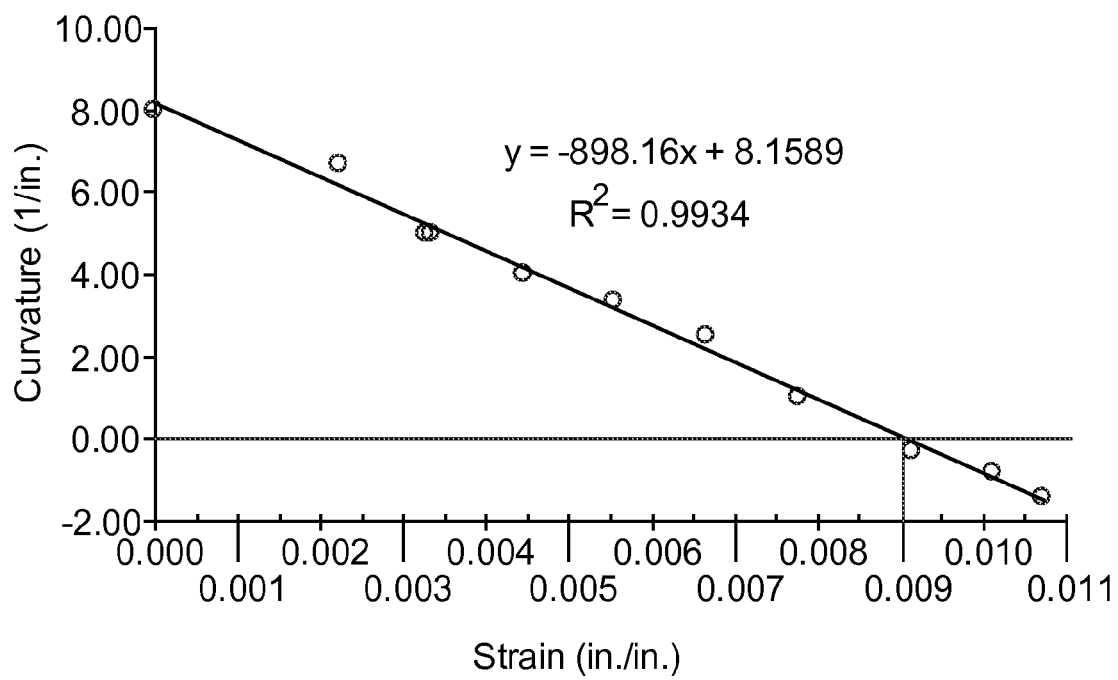
FIG. 13 is a graph of the curvature obtained (ordinate) versus the biaxial strain induced by stretching (abscissa) for a series of multi-layer webs formed as described in Example 2.

A series of experiments were performed similar to that described above in this example, except that different levels of biaxial strain were induced, using web line tension to induce machine-directional strain and the tenter system to induce cross-machine-directional strain. Curvature of the resulting multi-layer web was measured using the curl gauge disclosed in the paper "Measurement of Web Curl" published in the Proceedings of the Applied Webhandling Conference, AIMCAL 2006, which is incorporated by reference herein. The results of these experiments are shown in FIG. 13, which is a graph of the curvature of the resulting multi-layers webs (ordinate) versus the biaxial strain (abscissa) that was induced by stretching during curing of the coating. It will be observed that in this graph, as in the experiment described in this example, 0.9% biaxial strain was needed to produce a flat product under these processing conditions. The graph also shows that a linear relationship exists between biaxial strain and curvature, indicating that curl can be controlled to any level to form a multi-layer web of a desired curvature (i.e., a reduced curl, flat or a reversed curl).

Example 3

Figure 12:
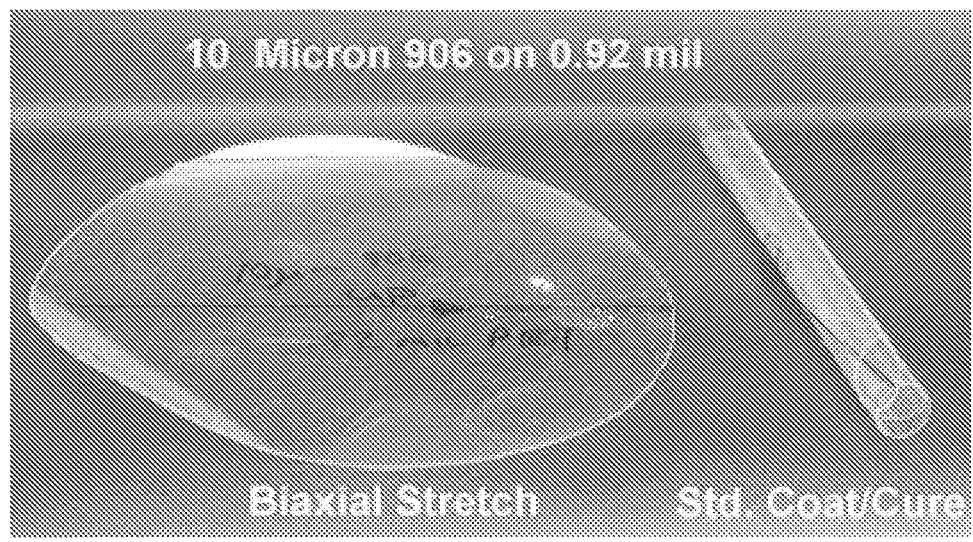
FIG. 12 is a digital photograph of multi-layer webs formed according to Examples 3 and 4.

A coating experiment was performed generally as described in Example 1, except that the coating was performed on a 0.92 mil (24 μm) thick roll of PET commercially available from DuPont Teijin Films of Hopewell, Va. At the conclusion of the coating and curing, when the 2" inch (5 cm) disc was die cut from the sheet and allowed to take on its natural shape, it was observed that the disc curled upon itself into a tight cylinder of about a 5-mm radius, as shown on the right hand side of FIG. 12.

Example 4

A coating experiment was performed generally as described in Example 3, except that the tentering function was engaged to provide a strain of 0.9% in the cross-machine direction and a web line tension of 51 lbs (227 N; 5.1 PLI (894 N/m) based on the 10-inch-wide (0.254-m-wide) web) was used to provide a 0.9% strain in the machine direction. At the conclusion of the coating and curing, when the 2" inch (5 cm) disc was die cut from the sheet and allowed to take on its natural shape, it was found that the disc lay substantially flat as depicted on the left hand side of FIG. 12.

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the invention are set forth in the following claims.

What is claimed is:

1. A method for reducing strain-induced curl in a multi-layer web, the method comprising:
    providing a coated web, the coated web including a coating applied to a web of indeterminate length, the coating being characterized by at least partially shrinking when cured;
    curing the coating to form a multi-layer web, the multi-layer web including a strain induced by curing the coating during a coating stress development period; and
    stretching the web during the coating stress development period, wherein stretching the web substantially cancels the strain induced by curing such that the resulting multi-layer web is substantially flat, wherein stretching the web increases a dimension of the web during the stretching step;
    wherein curing at least includes applying radiation to the coating subsequent to stretching the web in a cross-machine direction.

2. The method of claim 1, wherein curing the coating induces a strain in the machine direction and the cross-machine direction, and wherein stretching the web includes stretching the web in the machine direction and the cross-machine direction.

3. The method of claim 2, wherein stretching the web in the machine direction and the cross-machine direction includes stretching the web in the machine direction and the cross-machine direction simultaneously.

4. The method of claim 2, wherein stretching the web in the machine direction and the cross-machine direction includes:
    a first stretching step in which the web is stretched in one of the machine direction and the cross-machine direction, and
    a second stretching step in which the web continues to be stretched in the one of the machine direction and the cross-machine direction and is additionally stretched in the other of the machine direction and the cross-machine direction,
    wherein the coating is cured during the second stretching step.

5. The method of claim 1, wherein curing includes curing by at least one of actinic radiation, UV radiation, visible-light radiation, electron beam radiation, X-ray radiation, IR radiation, heat, and combinations thereof.

6. The method of claim 1, wherein the thickness of the resulting multi-layer web is less than about 500 μm.

7. The method of claim 1, wherein the coating comprises at least one of acrylate and epoxy.

8. The method of claim 1, wherein the multi-layer web comprises a multi-layer optical film.

9. The method of claim 1, wherein stretching includes applying a web line tension of at least about 525 N/m to the web.

10. The method of claim 1, wherein stretching the web includes passing the web through a web stretching assembly adapted to stretch the web in a cross-machine direction.

11. The method of claim 10, wherein the web includes lateral ends, and wherein the web stretching assembly includes:
    a roller adapted to rotate about an axis of rotation;

an endplate positioned adjacent an end of the roller and adapted to rotate about the axis rotation, the endplate including an outer circumferential surface;

a groove formed in the outer circumferential surface, the groove extending circumferentially; and a belt dimensioned to be received within a portion of the groove to grip a lateral end of the web between the groove and the belt, wherein the endplate is oriented at an angle with respect to the axis of rotation such that the web is stretched in the cross-machine direction when it passes over the roller and endplate.

12. The method of claim 1, wherein stretching the web includes stretching the web within the elastic range of the web.

13. The method of claim 1, wherein applying radiation to the coating includes applying radiation selected from a group consisting of actinic radiation, ultraviolet radiation, visible light radiation, electron beam radiation, X-ray radiation, and infrared radiation.

14. The method of claim 13, wherein the radiation process occurs after a point of maximal stretch.

15. The method of claim 14, wherein the radiation process occurs after a point of maximal cross-machine stretch.

16. The method of claim 1, wherein at least some stretching occurs after a point of initial solidification of the coating.

17. The method of claim 1, wherein no stretching occurs between a start of the curing process and initial solidification of the coating.

18. The method of claim 1, wherein all of the stretching occurs after the point of initial solidification of the coating.

19. The method of claim 1, wherein all of the stretching occurs prior to the point wherein the coating is substantially cured.

* * * * *